(12) United States Patent
  Tanabe

(10) Patent No.: US 12,602,141 B2
(45) Date of Patent: Apr. 14, 2026

(54) INFORMATION PROCESSING APPARATUS INFORMATION PROCESSING METHOD, AND NON-TRANSITORY COMPUTER READABLE MEDIUM

(71) Applicant: FUJIFILM BUSINESS INNOVATION CORP., Tokyo (JP)

(72) Inventor: Shigeru Tanabe, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 397 days.

(21) Appl. No.: 18/177,194

(22) Filed: Mar. 2, 2023

(65) Prior Publication Data

US 2024/0094869 A1     Mar. 21, 2024

(30) Foreign Application Priority Data

Sep. 15, 2022     (JP) ................................. 2022-147300

(51) Int. Cl.
  G06F 3/0482     (2013.01)
  G06F 3/01     (2006.01)
(52) U.S. Cl.
  CPC ............ G06F 3/0482 (2013.01); G06F 3/017 (2013.01); *G06F 2203/04108* (2013.01)

(58) Field of Classification Search
  CPC ..... G06F 3/048–05; G06F 2203/04108; G06F 3/017
  See application file for complete search history.

(56) References Cited

U.S. PATENT DOCUMENTS

| | | | | |
|---|---|---|---|---|
| 2008/0174570 A1* | 7/2008 | Jobs | .................. | H04M 1/72436 |
| | | | | 345/173 |
| 2010/0013852 A1* | 1/2010 | Liu | ..................... | G06F 3/04886 |
| | | | | 345/592 |
| 2012/0133585 A1* | 5/2012 | Han | ........................ | G06F 3/017 |
| | | | | 345/158 |
| 2016/0092062 A1* | 3/2016 | Miyagi | ................... | G06F 3/017 |
| | | | | 345/173 |
| 2017/0206004 A1* | 7/2017 | De Bruyn | ........... | G06F 3/04883 |
| 2021/0240332 A1* | 8/2021 | Walkin | ................ | G06F 3/04883 |
| 2022/0404932 A1* | 12/2022 | Gray | ..................... | G06F 3/0418 |

FOREIGN PATENT DOCUMENTS

JP     5625599 B2     11/2014

* cited by examiner

*Primary Examiner* — Daniel Rodriguez
(74) *Attorney, Agent, or Firm* — Oliff PLC

(57)     ABSTRACT

An information processing apparatus includes a processor configured to: in an operation of selecting and executing an object in a screen by a contactless operation with a target, allocate a first region for selecting the object to a mid-air space immediately above the screen; and allocate a second region for executing the selected object to a mid-air space farther from the screen than the first region.

9 Claims, 17 Drawing Sheets

Figure 7:
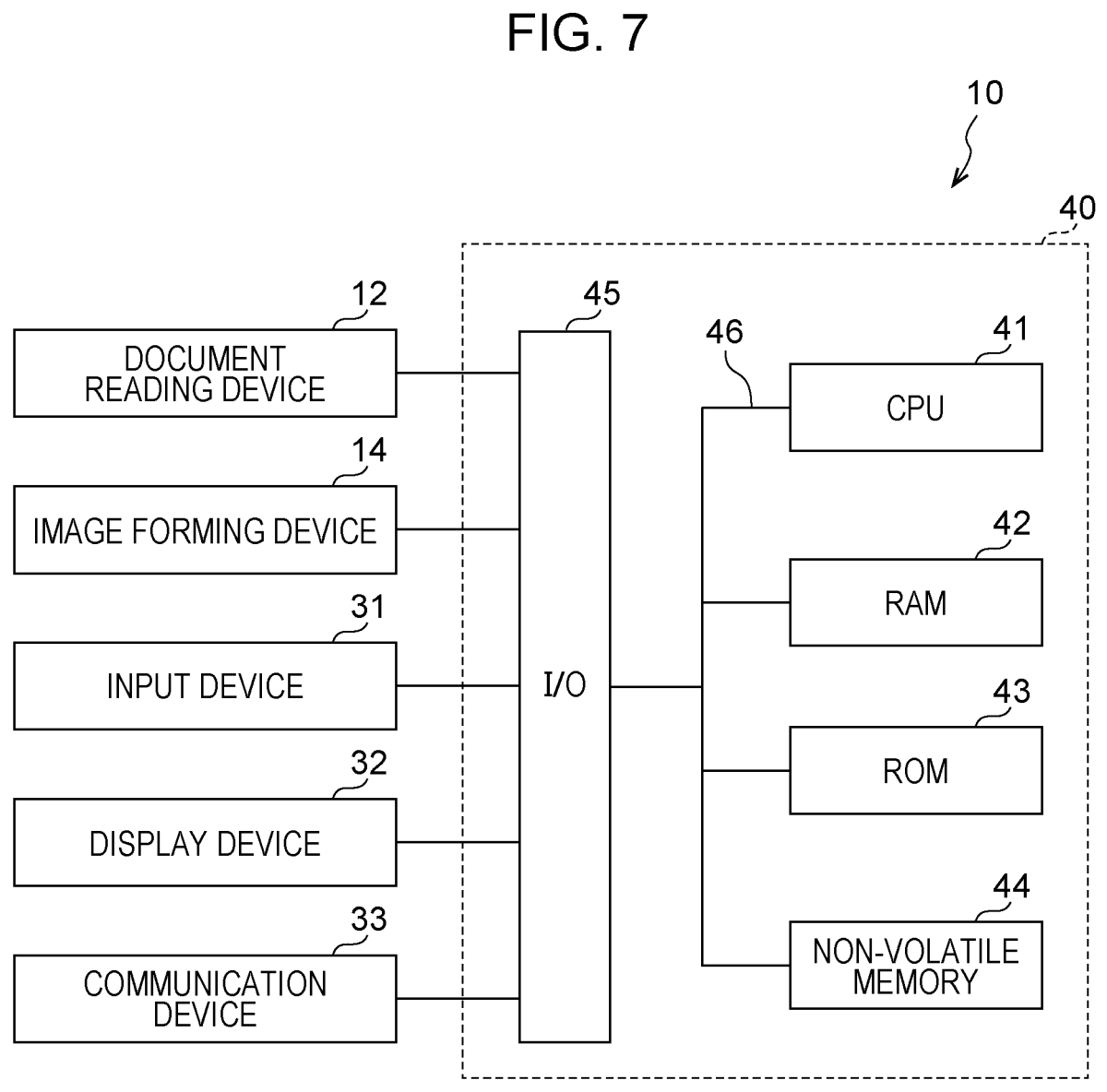

DOCUMENT
READING DEVICE

14

IMAGE FORMING DEVICE

31

INPUT DEVICE

32

DISPLAY DEVICE

33

COMMUNICATION
DEVICE

I/O

46

41

CPU

42

RAM

43

ROM

44

NON-VOLATILE
MEMORY

3

FULCRUM
(BASE OF FINGER OR WRIST)

30    15

P2

SECOND REGION     R2

3     Th2

P3     THIRD REGION     R3

3     Th1

P6     P1     P5     FIRST
REGION 3     3     D     3     R1

INFORMATION PROCESSING APPARATUS INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-147300 filed Sep. 15, 2022.

BACKGROUND

(i) Technical Field

The present disclosure relates to an information processing apparatus, an information processing method, and a non-transitory computer readable medium.

(ii) Related Art

For example, Japanese Patent No. 5625599 describes an information processing apparatus that can reduce operational errors potentially caused by executing a predetermined function in response to movement of a pointing position. The information processing apparatus includes a detection unit that detects a position of an operating body relative to an operation screen, and a control unit that controls a display unit such that an object selected based on a detection result of the detection unit and an object related to the selected object are sequentially unfolded and displayed on the operation screen. The objects include a function object associated with a predetermined function and an execution object associated with execution processing of the predetermined function. The control unit causes the execution processing of a function to be executed in response to a transition of the position of the operating body detected by the detection unit from a position corresponding to the function object to a position corresponding to the execution object, and controls display of the operation screen so that the objects are folded in an order opposite to that at the time of unfolding in response to cancellation of selection of the object based on a detection result of the detection unit.

SUMMARY

A technique is available for selecting and executing an object in a screen by a contactless operation with a target such as a finger such that the target is brought closer to the screen to select an object at a position far from the screen and subsequently execute the selected object at a position close to the screen.

In a case where the target is brought closer to the screen to select an object, however, it is difficult to determine a position of the target away from the screen, and a wrong object may be selected.

Aspects of non-limiting embodiments of the present disclosure relate to an information processing apparatus, an information processing method, and a non-transitory computer readable medium in which in selection and execution of an object in a screen in a contactless manner, erroneous selection of the object is less likely to occur than in a case where a target is brought closer to the screen to select an object.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: in an operation of selecting and executing an object in a screen by a contactless operation with a target, allocate a first region for selecting the object to a mid-air space immediately above the screen; and allocate a second region for executing the selected object to a mid-air space farther from the screen than the first region.

BRIEF DESCRIPTION OF THE DRAWINGS

An exemplary embodiment of the present disclosure will be described in detail based on the following figures, wherein:

FIG. 5 is a diagram illustrating an example transition of a screen displayed on the operation panel, presenting how the screen transitions in response to the user operating the operation panel;

FIG. 6 is a diagram illustrating an example in which the user selects a "Copy" button, which is an example of an object, on a home screen;

FIG. 7 is a block diagram illustrating an example configuration of a substantial part of an electrical system of the image processing apparatus according to the exemplary embodiment;

FIG. 14 is a diagram illustrating an example of a home screen corresponding to the position of the user's finger according to the exemplary embodiment;

DETAILED DESCRIPTION

The following describes an exemplary embodiment of the present disclosure in detail with reference to the drawings. Components and processes that have substantially the same operations and functions are assigned the same reference symbols throughout the drawings, and redundant descriptions thereof may be omitted. The drawings are merely presented in schematic form to allow a full understanding of the present disclosure. Therefore, the present disclosure is not limited to only the illustrated examples. In this exemplary embodiment, descriptions of configurations that are not directly related to the present disclosure or are well known may be omitted.

Figure 1:
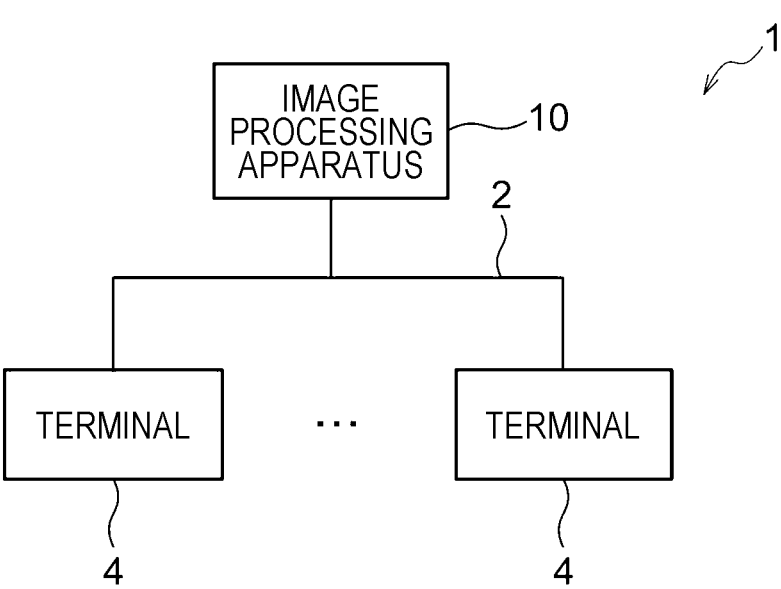
FIG. 1 is a diagram illustrating an example configuration of an information processing system including an information processing apparatus having a contactless user interface through which a user performs an operation in a contactless manner.

FIG. 1 is a diagram illustrating an example configuration of an information processing system 1 including an information processing apparatus having a contactless user interface through which a user performs an operation in a contactless manner.

The information processing apparatus in the information processing system 1 may be applied to any field as long as the information processing apparatus has a contactless user interface. Examples of the information processing apparatus include an image processing apparatus, an automatic teller machine (ATM), a vending machine, and an automatic ticket dispenser. The information processing apparatus may be for personal use only or usable by an unspecified number of users.

For example, an image processing apparatus 10 installed in a workplace as an example of the information processing apparatus will be described hereinafter with reference to FIGS. 1 and 2.

Figure 2:
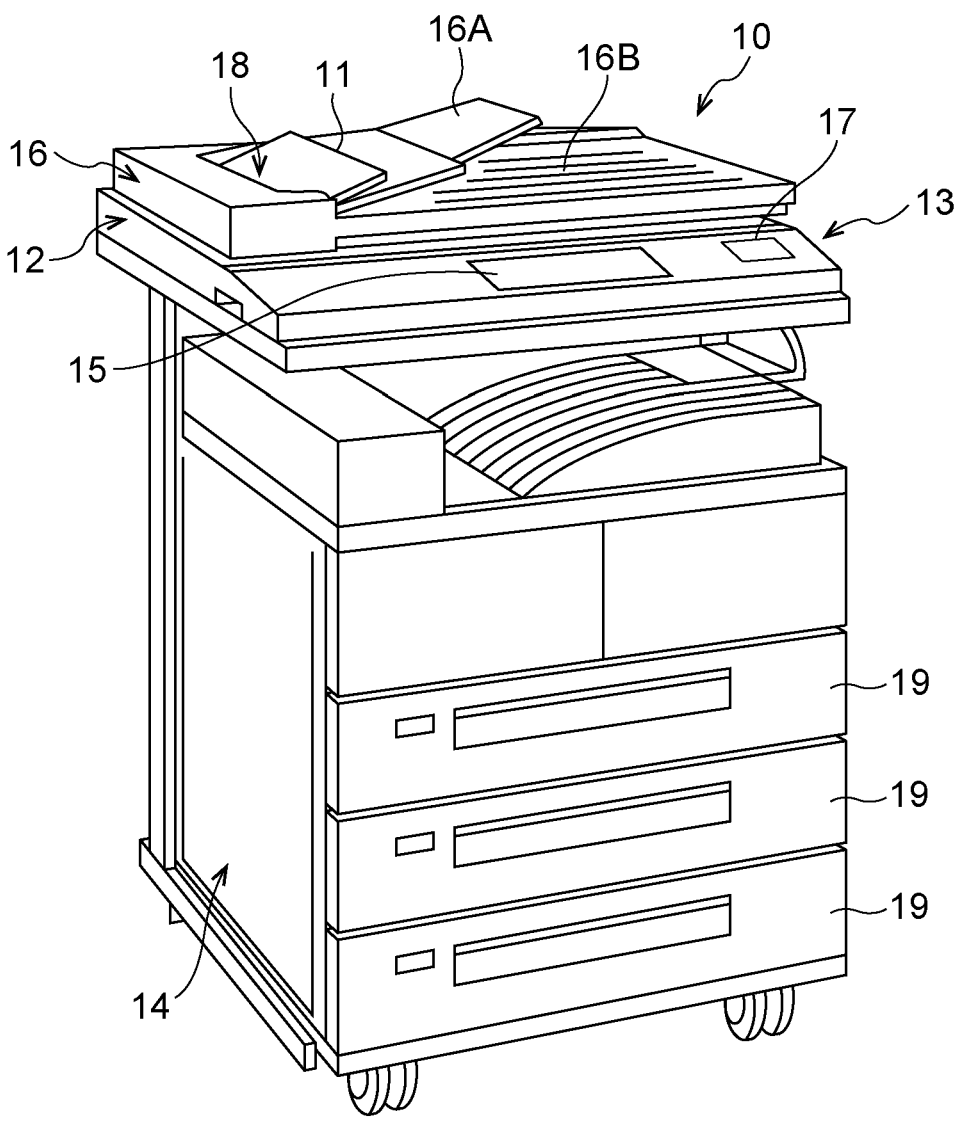
FIG. 2 is a perspective view of a substantial part of an image processing apparatus according to an exemplary embodiment.

FIG. 2 is a perspective view of a substantial part of the image processing apparatus 10 according to this exemplary embodiment.

As described below, the image processing apparatus 10 is configured to execute functions related to images in accordance with instructions from users. The image processing apparatus 10 is connected to, for example, a plurality of terminals 4 to be used by individual users via a communication line 2.

Each user transmits image data generated by a corresponding one of the terminals 4 to the image processing apparatus 10 through the communication line 2 to cause the image processing apparatus 10 to execute desired image processing. Alternatively, a user may bring a portable storage medium such as a Universal Serial Bus (USB) memory or a memory card storing image data to the image processing apparatus 10 and connect the portable storage medium to the image processing apparatus 10 to cause the image processing apparatus 10 to execute desired image processing. Alternatively, a user may bring a document 11 having at least one of text or an image to the image processing apparatus 10 and make the image processing apparatus 10 read the document 11 to cause the image processing apparatus 10 to execute desired image processing.

The communication line 2 may be of any type that provides a connection between the image processing apparatus 10 and the terminals 4, such as a wired connection, a wireless connection, or a combination of wired and wireless connections. In addition, any number of terminals 4 may be connected to the image processing apparatus 10. For example, none of the terminals 4 may be connected to the image processing apparatus 10.

The terminals 4 are information devices configured to be used by users. The terminals 4 may be any type of information device having a data storage function and a data communication function. The terminals 4 include, for example, computers intended to be used at fixed positions, and mobile terminals intended to be transported and used, such as smartphones and wearable devices.

As illustrated in FIG. 2, the image processing apparatus 10 has, for example, a scan function for reading an image on a recording medium such as paper as image data, a print function for forming an image represented by image data on a recording medium, and a copy function for forming the same image as an image formed on a recording medium onto another recording medium. The copy function, the print function, and the scan function are examples of image processing to be performed by the image processing apparatus 10.

The image processing apparatus 10 illustrated in FIG. 2 includes, for example, a document reading device 12 in an upper portion thereof, and an image forming device 14 below the document reading device 12.

The document reading device 12 includes an optical reading device (not illustrated) and a document transport device 18. The document transport device 18 is disposed in a document cover 16. The document cover 16 is provided with a document table 16A, on which documents 11 are placed. The document transport device 18 sequentially feeds each of the documents 11 on the document table 16A and transports the document 11 onto a transported-document scanning glass (not illustrated). The document reading device 12 reads the content of the document 11 transported onto the transported-document scanning glass as image data using the optical reading device. Thereafter, the document transport device 18 discharges the document 11 whose content has been read onto a discharge table 16B included in the document cover 16.

The image forming device 14 forms an image represented by image data on a recording medium. Recording media are stored in storage trays 19 that are classified by the type or size of recording media. The image forming device 14 may form an image in any color on a recording medium and may form a color image or a monochrome image.

The image processing apparatus 10 includes, in a front portion thereof, an operation display device 13 that accepts an operation for executing various functions such as the copy function, the print function, and the scan function from a user.

Specifically, the operation display device 13 includes a reader device 17 that acquires information on a user who performs an operation, and an operation panel 15 that accepts an operation performed by the user.

For example, in response to the user bringing their employee identity card close to the reader device 17, the reader device 17 reads identification information (referred to as a "user ID") for uniquely identifying the user from an integrated circuit (IC) chip incorporated in the employee identity card in a contactless manner.

The operation panel 15 is a display having a touch panel superimposed thereon. The operation panel 15 displays, as an icon image, an object to be operated by the user to execute a desired function. The object may be of any type that is to be operated by the user, and includes, for example, a button, a scroll bar, a check box, and a radio button. In response to the user performing an operation on the object, the image processing apparatus 10 executes a process associated in advance with the content of the operation, and a response to the operation is displayed on the operation panel 15.

Figure 3A:
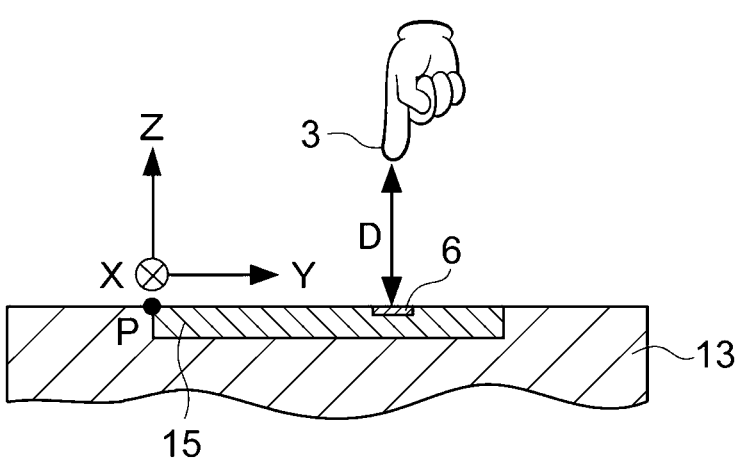
FIG. 3A is a sectional view of an operation panel.
Figure 3B:
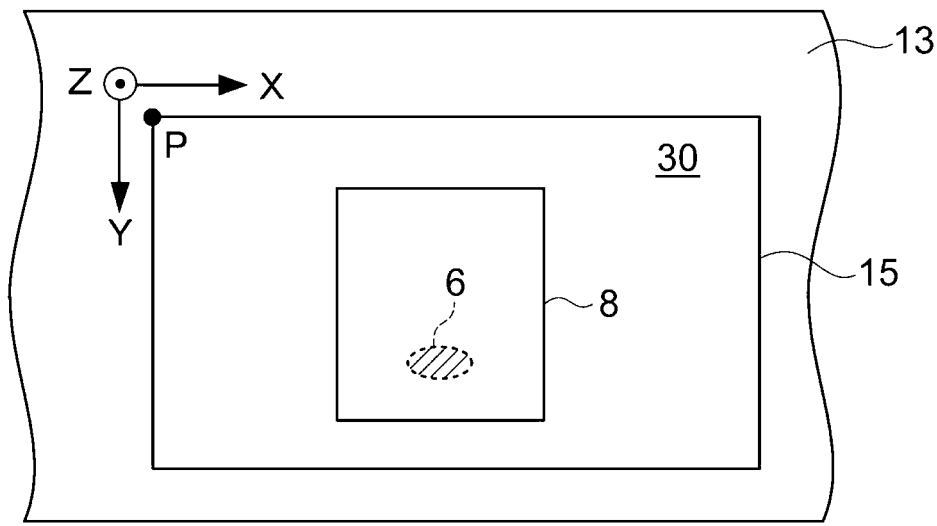
FIG. 3B is a plan view of the operation panel when viewed in a direction facing a display surface of the operation panel.

FIGS. 3A and 3B illustrate an example of the operation panel 15 that allows detection of an operation position 6 of the user in a contactless manner. FIG. 3A is a sectional view of the operation panel 15, and FIG. 3B is a plan view of the operation panel 15 when viewed in a direction facing a display surface of the operation panel 15.

The operation panel 15 detects the position of the user's finger, that is, the operation position 6, in a contactless manner. The phrase "detecting the operation position 6 in a contactless manner" refers to detecting the position of a user's finger in response to the user holding their finger in a mid-air space that is above a display surface of the operation panel 15 and that is away from the display surface of the operation panel 15 in a range of the display surface of the operation panel 15 without pressing their finger against the display surface of the operation panel 15. A mid-air space above the display surface of the operation panel 15 in a range of the display surface of the operation panel 15 is hereinafter referred to as a mid-air space "over the operation panel 15" or "above the operation panel 15". The phrase "holding the user's finger over something (such as the operation panel 15)" means that the user points at a position in a mid-air space over the operation panel 15 with their finger without touching the display surface of the operation panel 15.

The operation panel 15 includes a so-called capacitive touch panel that detects the operation position 6 from a change in electrostatic capacitance caused by the user holding their finger over the operation panel 15. In the operation panel 15 including such a touch panel, a change in electrostatic capacitance at a position closest to the user's finger is larger than a change in electrostatic capacitance at any other position. Accordingly, the operation panel 15 outputs, as the operation position 6 of the user, a position at which the change in electrostatic capacitance is largest within the range of the operation panel 15.

To identify the operation position 6 of the user on the operation panel 15, an operation coordinate system is defined for the operation panel 15 to define a detection area for contactless detection of the position of the user's finger. The operation coordinate system is represented as a three-dimensional coordinate system having any position on the operation panel 15 as an origin P. In the example of the operation panel 15 illustrated in FIGS. 3A and 3B, the origin P is set at one of the vertices of the outline of the rectangular operation panel 15. In the example of the operation panel 15 illustrated in FIGS. 3A and 3B, furthermore, an X axis is set along a lateral direction of the operation panel 15 with respect to the origin P, a Y axis is set along a longitudinal direction of the operation panel 15 with respect to the origin P, and a Z axis is set so as to be orthogonal to the X and Y axes. The Z-axis direction is referred to as a height direction of the operation panel 15.

The operation position 6 of the user on the operation panel 15 is represented by a coordinate point (x, y), which is a combination of the coordinate value x of the X coordinate and the coordinate value y of the Y coordinate of a position at which the change in electrostatic capacitance is largest within the range of the operation panel 15.

When the operation panel 15 displays objects, an object displayed so as to include the operation position 6 of the user is recognized as the object being operated by the user. In the example of the operation panel 15 illustrated in FIG. 3B, since the operation position 6 of the user is included in the area of a button 8 in a screen 30 displayed on the operation panel 15, the user is recognized as operating the button 8. An object displayed so as to include the operation position 6 of the user may be hereinafter referred to as an "object corresponding to the operation position 6". The operation position 6 is an example of a "detected position at which an operation performed by a user has been detected" according to this exemplary embodiment.

As illustrated in FIG. 3A, the length of a perpendicular drawn from a user's finger 3, which is held over the operation panel 15, to the display surface of the operation panel 15, that is, the distance from the user's finger 3 to the operation panel 15 in the height direction of the operation panel 15, is represented by an "operation distance D". The user's finger 3 is an example of a target with which the user performs operations. The target may be a body part of the user, other than the user's hand or fingers, or may be a stylus or any other tool owned by the user. As the operation distance D decreases, the change in electrostatic capacitance at the operation position 6 of the user increases on the operation panel 15. Conversely, as the operation distance D increases, the change in electrostatic capacitance at the operation position 6 of the user decreases on the operation panel 15. Accordingly, associating the operation distance D with the amount of change in electrostatic capacitance in advance makes it possible to obtain the operation distance D from the amount of change in electrostatic capacitance on the operation panel 15.

Based on the correspondence relationship between the operation distance D and the amount of change in electrostatic capacitance, the operation panel 15 recognizes the operation position 6 of the user not only as a two-dimensional operation position 6 along the display surface of the operation panel 15 but also as a three-dimensional operation position 6 that takes the operation distance D into account. That is, when the operation position 6 of the user is represented as a three-dimensional position, the operation position 6 of the user is represented by a coordinate point (x, y, z) obtained by combining a coordinate value z representing the operation position 6 in the height direction of the operation panel 15 with the coordinate point (x, y). The coordinate value z is a coordinate value, on the Z axis, of a position the operation distance D away from the origin P along the Z axis.

The coordinate value z=0 means that the user is performing an operation while touching the display surface of the operation panel 15 with their finger. Accordingly, the image processing apparatus 10 also recognizes a difference in the manner of the operation of the user, such as whether the user is operating the operation panel 15 in a contactless manner or operating the operation panel 15 with their finger touching the operation panel 15. As described above, the operation panel 15 supports both a contact operation in which the user performs an operation while touching the display surface of the operation panel 15 with their finger and a contactless operation in which the user operates the operation panel 15 while holding their finger over the operation panel 15.

As described above, since the change in electrostatic capacitance at the operation position 6 of the user decreases on the operation panel 15 as the operation distance D increases, the operation distance D has an upper limit. If the user holds their finger over the operation panel 15 at a position exceeding the upper limit of the operation distance D, the electrostatic capacitance at the operation position 6 of the user does not change, and the operation panel 15 makes no response to the operation of the user.

The detection area for objects is a mid-air region that is about 3 cm away from the operation panel 15, for example. In other words, in response to the user moving the user's finger 3 close to a position about 3 cm from the operation panel 15, the electrostatic capacitance in the corresponding object changes and a contactless input is detected. The XYZ coordinates of the position in the detection area of the user's finger 3 are acquired as those of the operation position 6. In response to the user further moving the user's finger 3 to a position closer than 3 cm, the XYZ coordinates of the position are acquired.

Figure 4:
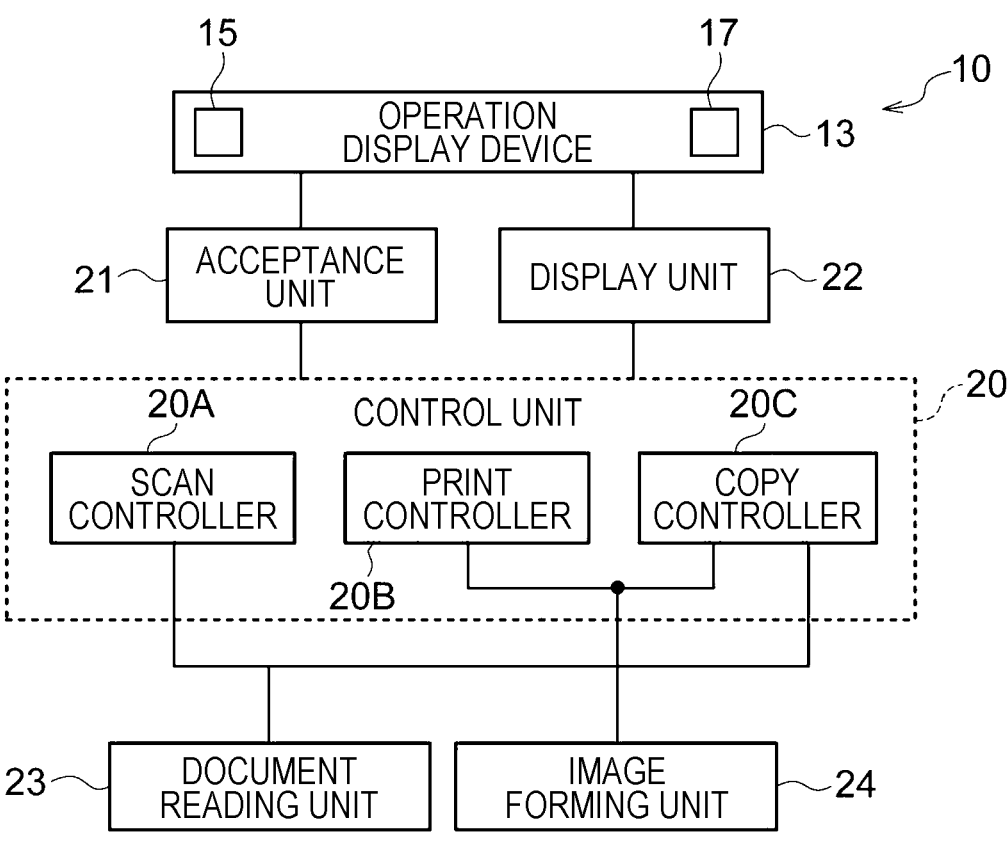
FIG. 4 is a diagram illustrating an example functional configuration of the image processing apparatus according to the exemplary embodiment.

FIG. 4 is a diagram illustrating an example functional configuration of the image processing apparatus 10 according to this exemplary embodiment. The image processing apparatus 10 includes functional units, namely, a control unit 20, an acceptance unit 21, a display unit 22, a document reading unit 23, and an image forming unit 24.

The acceptance unit 21 accepts a user ID of a user who operates the image processing apparatus 10 from the reader device 17 of the operation display device 13, and also accepts the operation position 6 of the user on the operation panel 15 from the operation panel 15 of the operation display device 13. The acceptance unit 21 further accepts image data from a portable storage medium connected to the terminal 4 of the user or the image processing apparatus 10. The acceptance unit 21 notifies the control unit 20 of the user ID, the operation position 6 of the user, and the image data, which have been accepted.

When notified of the user ID by the acceptance unit 21, the control unit 20 performs an authentication process to determine whether the user represented by the user ID is a user (referred to as a "registered user") permitted to use the image processing apparatus 10. When notified of the operation position 6 of the user on the operation panel 15 by the acceptance unit 21, the control unit 20 determines whether the object displayed at the operation position 6 of the user is selected in the screen 30 displayed on the operation panel 15, and executes a process associated in advance with the selected object. For example, if the object is a button 8 for starting the print function, the control unit 20 starts the print function to form an image represented by the image data accepted by the acceptance unit 21 on a recording medium.

Since the image processing apparatus 10 has the copy function, the print function, and the scan function, the control unit 20 includes a scan controller 20A that controls the scan function, a print controller 20B that controls the print function, and a copy controller 20C that controls the copy function. Any one of the scan controller 20A, the print controller 20B, and the copy controller 20C performs control in accordance with the content of the process associated with the object operated by the user. In one example, the image processing apparatus 10 may have a facsimile function. In this example, the control unit 20 includes a facsimile controller that controls the facsimile function.

When the operation performed by the user through the object is an operation related to the scan function, the scan controller 20A controls the document reading unit 23 to implement the scan function. When the operation performed by the user through the object is an operation related to the print function, the print controller 20B controls the image forming unit 24 to implement the print function. When the operation performed by the user through the object is an operation related to the copy function, the copy controller 20C controls the document reading unit 23 to generate image data of the document 11. Thereafter, the copy controller 20C controls the image forming unit 24 to form an image represented by the generated image data on a recording medium.

The document reading unit 23 drives the document reading device 12 under the control of the scan controller 20A and the copy controller 20C to, for example, transport each of the documents 11 placed on the document table 16A and generate image data of the transported document 11.

The image forming unit 24 drives the image forming device 14 under the control of the print controller 20B and the copy controller 20C to, for example, transport a recording medium stored in any of the storage trays 19 and form an image represented by the image data on the transported recording medium.

The display unit 22 displays, for example, a result of the authentication process performed on the user and a result of the process executed by the control unit 20 in response to the operation performed by the user through the object on the operation panel 15 in the operation display device 13 in accordance with an instruction from the control unit 20.

Figure 5:
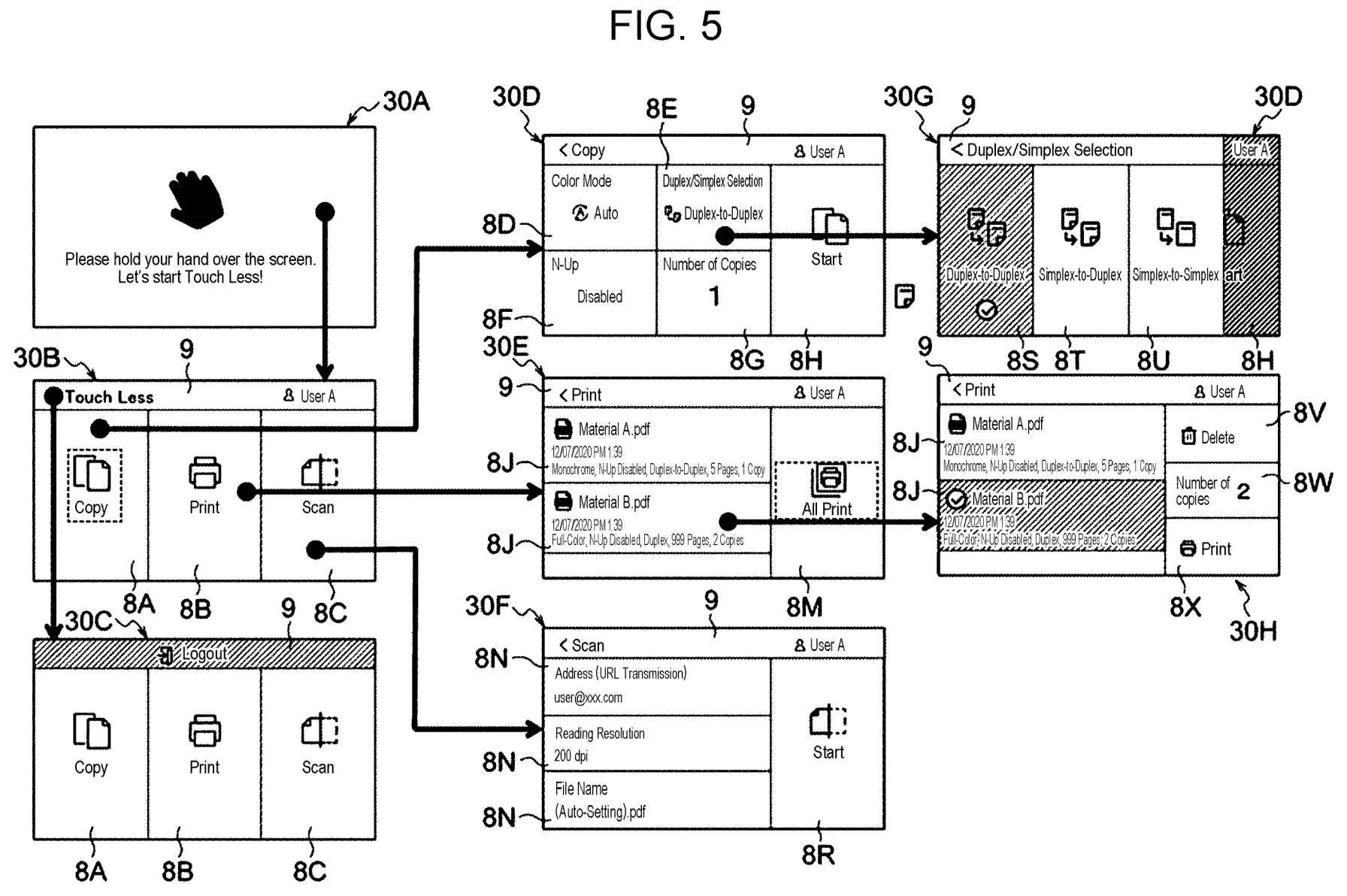

FIG. 5 is a diagram illustrating an example transition of the screen 30 displayed on the operation panel 15, presenting how the screen 30 transitions in response to the user operating the operation panel 15.

The display of the screen 30 on the operation panel 15, which is performed by the display unit 22, may also be interpreted as the display of the screen 30 on the operation panel 15 that is performed by the control unit 20 because the display unit 22 displays the screen 30 in accordance with an instruction from the control unit 20. A mid-air space extending along the Z axis and having a bottom surface corresponding to the display range of the screen 30 displayed on the operation panel 15 is expressed as a mid-air space "over the screen 30" or "above the screen 30", and a mid-air space extending along the Z axis and having a bottom surface corresponding to the display range of an object displayed in the screen 30 is expressed as a mid-air space "over the object" or "above the object". Like the expression "over the operation panel 15" or "above the operation panel 15", the expression "over the screen 30" or "above the screen 30" and the expression "over the object" or "above the object" do not mean the upper side of the screen 30 and the upper side of the object based on the up, down, left, and right directions in the real space, respectively, but mean a mid-air space in a direction facing the screen 30 and a mid-air space in a direction facing the object, respectively.

For convenience of description, screens 30 whose types are distinguished from each other are accompanied by different alphabet symbols associated with the types of the screens 30. Screens 30 whose types are not distinguished from each other are collectively expressed as the "screens 30" regardless of their types. Buttons 8, which are an example of objects, whose types are distinguished from each other are accompanied by different alphabet symbols associated with the types of the buttons 8. Buttons 8 whose types are not distinguished from each other are collectively expressed as the "buttons 8" regardless of their types.

When it is determined that the user who performs an operation is a registered user through the authentication process, the control unit 20 causes a start screen 30A to be displayed on the operation panel 15. The start screen 30A displays an instruction given to the user, such as "Please hold your hand over the screen" and "Let's start Touch Less!", for example.

When the user holds their finger over the start screen 30A, a cursor is displayed at the operation position 6 of the user on the start screen 30A. In the example of the start screen 30A illustrated in FIG. 5, a cursor in the shape of a hand is displayed. The shape of the cursor is an example, and, for example, a circular cursor may be displayed. In response the user holding their finger over the start screen 30A, a home screen 30B is displayed. The instruction given to the user in the start screen 30A is also used to instruct the user how to perform an operation on the operation panel 15.

The home screen 30B displays, for example, buttons 8 for individually selecting the various functions of the image processing apparatus 10, and a navigation bar 9 for displaying information useful for the user to perform an operation. Since the image processing apparatus 10 has the copy function, the print function, and the scan function, a "Copy" button 8A for selecting the copy function, a "Print" button 8B for selecting the print function, and a "Scan" button 8C for selecting the scan function are displayed on the home screen 30B. The navigation bar 9 displays, for example, the name of a user who has been authenticated, such as "user A", the name of a screen being displayed on the operation panel 15, such as "home", and information for notifying the user that the operation panel 15 is in a contactless operation mode, such as "Touch Less".

In response to the user holding their finger over the "Copy" button 8A, the "Copy" button 8A is selected. Upon selection of the "Copy" button 8A, a copy screen 30D is displayed on the operation panel 15. The copy screen 30D displays buttons 8D to 8G for setting copy conditions, and a copy start button 8H for starting copying under the set copy conditions.

The copy screen 30D illustrated in FIG. 5 displays, as an example of the buttons 8 for setting copy conditions, for example, a color mode button 8D for selecting a copy color, a duplex/simplex selection button 8E for selecting a double-sided (duplex) or single-sided (simplex) copy mode, an N-up button 8F for selecting an image layout on a recording medium, and a number-of-copies button 8G for selecting the number of copies to be made.

In response to the user holding their finger over any one of the buttons 8D to 8G for setting the respective copy conditions, the button 8 corresponding to the operation position 6 of the user is selected, and the screen 30 for setting the copy condition corresponding to the selected button 8 is displayed. In response to the duplex/simplex selection button 8E being selected on the copy screen 30D, a duplex/simplex selection screen 30G for selecting a duplex or simplex copy mode is displayed on the operation panel 15 in such a manner as to be superimposed on the copy screen 30D.

The duplex/simplex selection screen 30G illustrated in FIG. 5 displays, for example, a duplex-to-duplex selection button 8S for sequentially copying two-sided documents 11 on both sides of recording media, a simplex-to-duplex selection button 8T for sequentially copying one-sided documents 11 having text and the like on either side thereof on both sides of recording media, and a simplex-to-simplex selection button 8U for sequentially copying one-sided documents 11 having text and the like on either side thereof on either side of recording media.

In response to the user holding their finger over any one of the buttons 8S to 8U on the duplex/simplex selection screen 30G, the button 8 corresponding to the operation position 6 of the user is selected, and a copy mode corresponding to the selected button 8 is set. In the example of the duplex/simplex selection screen 30G illustrated in FIG. 5, the duplex-to-duplex selection button 8S is selected by the user.

In response to a duplex or simplex copy mode being set on the duplex/simplex selection screen 30G, the copy screen 30D is displayed on the operation panel 15. After the setting of the copy mode, the copy mode selected on the duplex/simplex selection screen 30G is displayed in the duplex/simplex selection button 8E on the copy screen 30D.

In the example described above, the user selects the duplex/simplex selection button 8E on the copy screen 30D. Also in response to the user selecting any one of the color mode button 8D, the N-up button 8F, and the number-of-copies button 8G on the copy screen 30D, a selection screen for selecting a copy condition corresponding to the selected one of the buttons 8 is displayed on the operation panel 15 in a manner similar to that for the duplex/simplex selection screen 30G.

In response to the user holding their finger over the copy start button 8H on the copy screen 30D, the copy start button 8H is selected. Upon selection of the copy start button 8H, a copying process for copying the content of the documents 11 on recording media is executed in accordance with the set copy conditions. Before the setting of the copy conditions, the buttons 8D to 8G on the copy screen 30D display initially set copy conditions that are set in advance.

In response to the user holding their finger over the "Print" button 8B on the home screen 30B, the "Print" button 8B is selected. Upon selection of the "Print" button 8B, a print screen 30E is displayed on the operation panel 15.

The print screen 30E displays print information buttons 8J each for displaying information on a piece of image data to be used for printing, and an all-print start button 8M for starting printing of all of the pieces of image data corresponding to the respective print information buttons 8J. In the example of the print screen 30E illustrated in FIG. 5, the print screen 30E in which two pieces of image data to be used for printing are accepted is illustrated. That is, the print screen 30E displays a number of print information buttons 8J equal to the number of pieces of image data accepted as targets for printing from the user, each print information button 8J corresponding to a corresponding one of the pieces of image data.

If the number of pieces of image data is too large to display the corresponding print information buttons 8J in the print screen 30E at the same time, in response to the user performing a gesture of moving their finger in an upward/downward direction of the print information buttons 8J, the operation panel 15 detects the movement of the operation position 6 and scrolls the print information buttons 8J. As a result, the print information buttons 8J that are not displayed in the print screen 30E are displayed in the print screen 30E.

Each of the print information buttons 8J displays a file name of image data to be used for printing and print conditions set by the user in advance for the image data. For example, when the user transmits image data from the terminal 4 to the image processing apparatus 10, print conditions set by the user using the terminal 4 are displayed in the print information button 8J.

In response to the user holding their finger over the all-print start button 8M, the all-print start button 8M is selected. Upon selection of the all-print start button 8M, a printing process for printing images represented by image data on recording media is executed in accordance with the set print conditions.

In response to the user holding their finger over any one of the print information buttons 8J, the print information button 8J over which the finger is held is selected. Upon selection of any one of the print information buttons 8J, a print edit screen 30H is displayed on the operation panel 15. The print edit screen 30H illustrated in FIG. 5 is displayed, for example, in response to the user selecting the print information button 8J corresponding to the image data representing "Material B .pdf".

The print edit screen 30H displays, for example, a delete button 8V for deleting the image data corresponding to the selected print information button 8J, a change button 8W for changing a print condition of the image data corresponding to the selected print information button 8J, and an indi-vidual-print start button 8X for printing only the image data corresponding to the selected print information button 8J. The print edit screen 30H illustrated in FIG. 5 displays, as an example of the change button 8W, a change button 8W for changing the number of copies to be printed. The print edit screen 30H also displays, for example, a change button 8W (not illustrated) for changing any other print condition, such as the color of an image to be printed.

In response to the user holding their finger over the "Scan" button 8C on the home screen 30B, the "Scan" button 8C is selected. Upon selection of the "Scan" button 8C, a scan screen 30F is displayed on the operation panel 15.

The scan screen 30F displays scan setting buttons 8N for setting scan conditions, and a scan start button 8R for starting reading of the documents 11 in accordance with the set scan conditions.

In response to the user holding their finger over any one of the scan setting buttons 8N, the scan setting button 8N corresponding to the operation position 6 of the user is selected, and a selection screen (not illustrated) for selecting the scan condition corresponding to the selected scan setting button 8N is displayed. That is, the user sets each of the scan conditions associated with the scan setting buttons 8N in the same manner as the operation of setting the copy conditions through the copy screen 30D. In response to the user holding their finger over the scan start button 8R, the scan start button 8R is selected. Upon selection of the scan start button 8R, a scanning process for converting the content of the documents 11 into image data is executed in accordance with the set scan conditions.

In response to the user holding their finger over the navigation bar 9 on the home screen 30B, the navigation bar 9 is selected. Upon selection of the navigation bar 9, a logout process of the authenticated user is performed. Then, as illustrated in a screen 30C, and the navigation bar 9 displays an indication of completion of the logout process.

The foregoing describes an example in which any one of the buttons 8 is selected in response to the user holding their finger over the button 8. In a contactless operation, the user's finger, which is in contact with the operation panel 15, can move. If an object whose area includes the operation posi-tion 6 is simply set as an object selected by the user because the area includes the operation position 6, another object adjacent to the object that the user is intended to operate may be incorrectly selected if the user's finger unintentionally moves. In addition, the user may pass their finger over another object not to be operated while moving the finger to above the object to be operated, and the unintended object may be incorrectly selected.

Accordingly, for example, when the user continuously holds their finger over an object for a predetermined period of time (a certain amount of time), the object over which the finger is held may be determined to be an object intention-ally selected by the user. In other words, when the operation position 6 of the user remains located in the area of a specific object on the operation panel 15 for a predetermined period of time (a certain amount of time), it is determined that the user has selected the object. In this exemplary embodiment, the predetermined period of time is 3 seconds. However, this example is not limiting. For example, the predetermined period of time may be set to a time other than 3 seconds. The method for detecting the operation position 6 is not limited to a detection method using the operation panel 15, which is a capacitive touch panel. For example, the operation position 6 may be detected using a time-of-flight (ToF) camera or the like.

Figure 6:
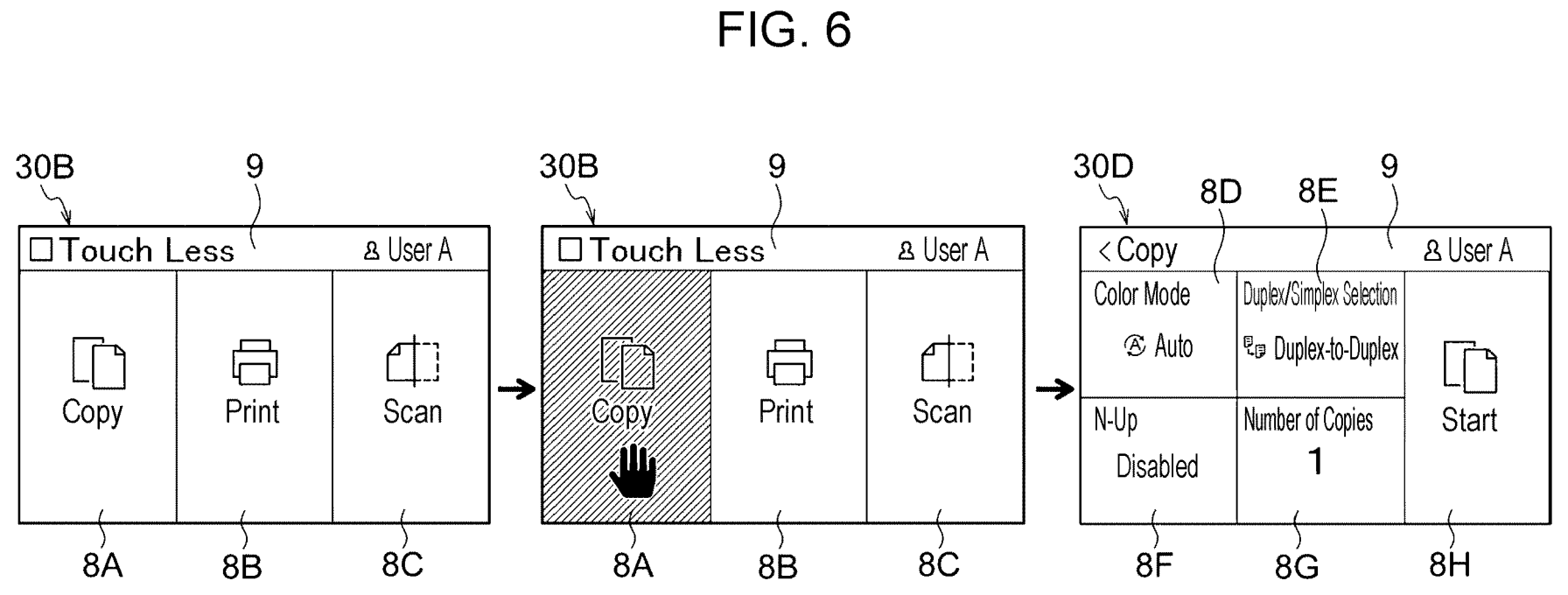

FIG. 6 is a diagram illustrating an example in which the user selects the "Copy" button 8A, which is an example of an object, on the home screen 30B.

For example, in response to the user holding their finger over the "Copy" button 8A, the operation position 6 is detected within the area of the "Copy" button 8A, and the "Copy" button 8A is selected.

Further, in accordance with a predetermined operation by the user, as illustrated in FIG. 6, the selected "Copy" button 8A is executed, and the copy screen 30D is displayed on the operation panel 15.

Each of the objects in the screens 30 is associated in advance with a process to be executed in response to the selection of the object such that a copying process is executed in response to selection of the copy start button 8H. To notify the user of the processes to be executed for the respective objects, each of the objects displays, for example, information indicating the content of the process to be executed in response to the selection of the object, such as "copy" for the copy start button 8H. The user understands a process associated with each of the objects by checking information indicating the content of the process to be executed in response to the selection of the object, that is, by checking an item associated with the object. As described above, the objects are displayed on the screens 30 in such a manner as to be associated with items each indicating the content to be processed. Accordingly, each of the objects is an example of an "item displayed on a screen" according to this exemplary embodiment.

Next, the configuration of the substantial part of an electrical system of the image processing apparatus 10 will be described with reference to FIG. 7. The image processing apparatus 10 is implemented using, for example, a computer 40.

In the computer 40, a central processing unit (CPU) 41, a random access memory (RAM) 42, a read only memory (ROM) 43, a non-volatile memory 44, and an input/output interface (I/O) 45 are connected to each other via a bus 46.

The CPU 41 is an example of a processor configured to perform processing of the functional units of the image processing apparatus 10 illustrated in FIG. 4. The RAM 42 is an example of a storage medium to be used as a temporary work area for the CPU 41. The ROM 43 is an example of a storage medium that stores an information processing program to be executed by the CPU 41. The non-volatile memory 44 is an example of a storage medium configured such that information stored therein is maintained even if power supply to the non-volatile memory 44 is shut off. Examples of the non-volatile memory 44 include a semiconductor memory and a hard disk. The non-volatile memory 44 is not necessarily incorporated in the computer 40, and may be, for example, a storage medium attachable to the computer 40 in a removable manner, such as a memory card.

The I/O 45 is connected to, for example, the document reading device 12, the image forming device 14, an input device 31, a display device 32, and a communication device 33.

The document reading device 12 and the image forming device 14 are devices that perform operations as described above. The input device 31 is a device that notifies the CPU 41 of an instruction from the user and a user ID of the user in response to receipt of the instruction and the user ID. Examples of the input device 31 include a touch panel constituting the operation panel 15, and the reader device 17. The display device 32 is a device that visually displays information processed by the CPU 41. Examples of the display device 32 include a display constituting the operation panel 15. The communication device 33 is connected to the communication line 2 and has a communication protocol for communicating with the terminals 4. The devices connectable to the I/O 45 are not limited to the devices illustrated in FIG. 7. The I/O 45 may be connected to a device necessary for implementing a function in accordance with the functions of the image processing apparatus 10.

As described above, in a case where the user's finger 3, which is an example of a target, is brought closer to the screen 30 to select an object, it is difficult to determine a position of the target away from the screen 30, and a wrong object may be selected.

In the image processing apparatus 10 according to this exemplary embodiment, accordingly, in an operation of selecting and executing an object in the screen 30 by a contactless operation with a target, a first region for selecting the object is allocated to a mid-air space immediately above the screen 30, and a second region for executing the selected object is allocated to a mid-air space farther from the screen 30 than the first region. In this manner, allocating the first region for selecting an object to a mid-air space immediately above the screen 30 may facilitate determination of the position of the user's finger 3. As a result, selection of a wrong object may be less likely to occur.

Figures 8, 9:
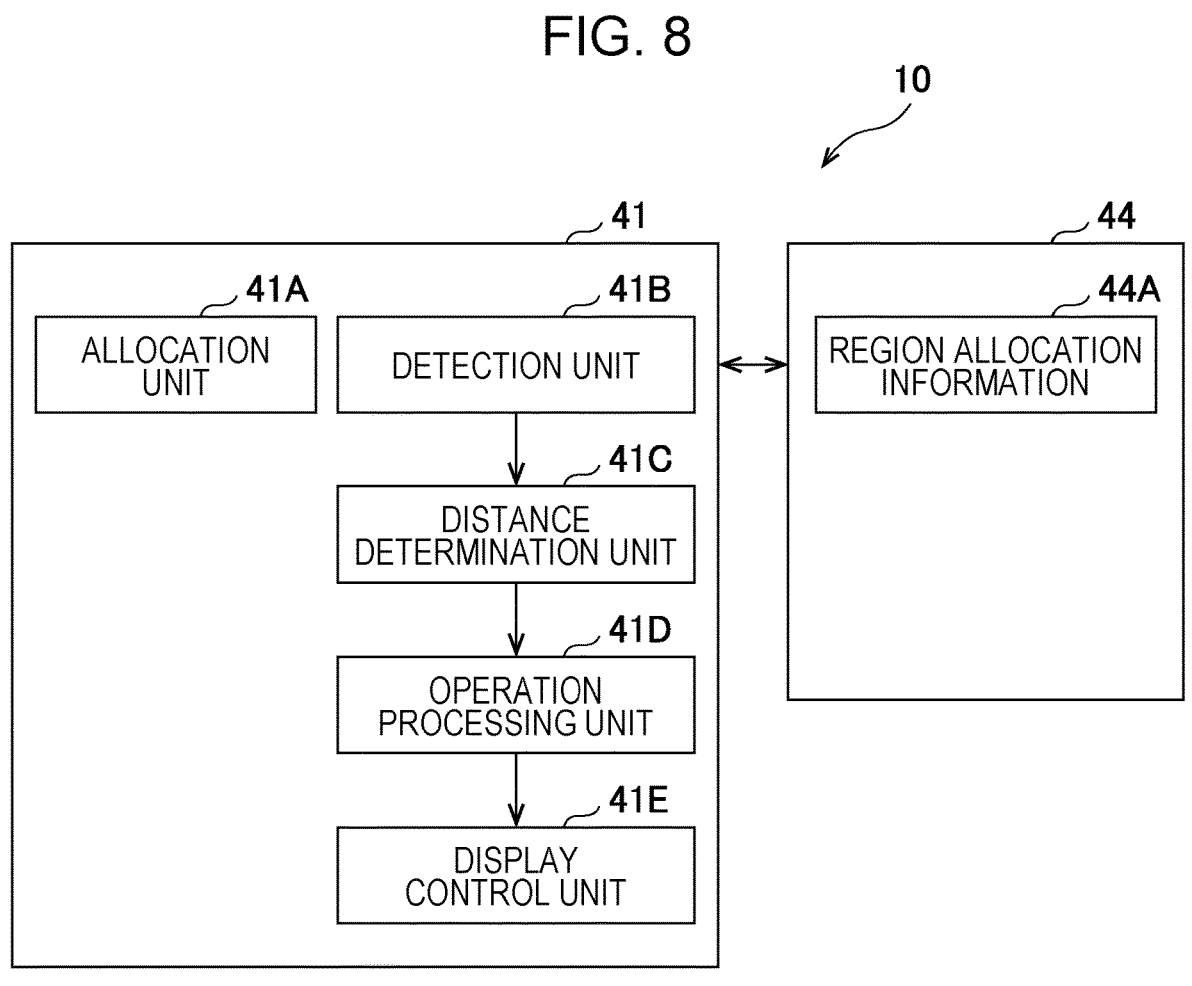
FIG. 8 is a block diagram illustrating an example functional configuration of the image processing apparatus according to the exemplary embodiment.
FIG. 9 is a diagram schematically illustrating an example of a mid-air region above the operation panel according to the exemplary embodiment when the operation panel is viewed from a side.

Specifically, the CPU 41 of the image processing apparatus 10 according to this exemplary embodiment functions as the components illustrated in FIG. 8 upon loading an information processing program stored in the ROM 43 into the RAM 42 and executing the information processing program.

FIG. 8 is a block diagram illustrating an example functional configuration of the image processing apparatus 10 according to this exemplary embodiment.

As illustrated in FIG. 8, the CPU 41 of the image processing apparatus 10 according to this exemplary embodiment functions as an allocation unit 41A, a detection unit 41B, a distance determination unit 41C, an operation processing unit 41D, and a display control unit 41E.

The allocation unit 41A allocates a first region for selecting an object to a mid-air space immediately above the screen 30, and allocates a second region for executing the selected object to a mid-air space farther from the screen 30 than the first region.

The non-volatile memory 44 stores region allocation information 44A related to the regions allocated by the allocation unit 41A. The region allocation information 44A includes the number of regions obtained by division, and the content of an operation to be allocated to each region, for example.

FIG. 9 is a diagram schematically illustrating an example of a mid-air region above the operation panel 15 according to this exemplary embodiment when the operation panel 15 is viewed from a side.

In the example illustrated in FIG. 9, the mid-air region is divided into two regions, that is, a first region R1 and a second region R2. The first region R1 is allocated an "operation of selecting an object", and the second region R2 is allocated an "operation of executing a selected object". In other words, the region allocation information 44A includes the number of regions obtained by division and the respective operations allocated to the regions, for example. The "operation of selecting an object" is an operation of selecting a certain object on the screen 30, and the "operation of executing a selected object" is an operation of executing the selected object on the screen 30. The number of regions obtained by division is not limited to two, and may be three, as described below.

The first region R1 and the second region R2 are separated by a first threshold Th1. The first threshold Th1 is a threshold for the distance from the screen 30 to the user's finger 3 (i.e., the operation distance D), and is set to an appropriate value within a range not exceeding the distance at which the user's finger 3 is detectable. This threshold is also held as the region allocation information 44A. In other words, the first region R1 and the second region R2 are defined according to their distances from the screen 30, and are allocated in advance different operations (i.e., selection and execution) to be performed in response to a contactless operation.

The detection unit 41B detects the user's finger 3 above the screen 30 and identifies the position of the detected user's finger 3. The position of the detected user's finger 3 is identified as a coordinate point (x, y, z) as described above.

The distance determination unit 41C determines the distance (the operation distance D) from the screen 30 to the user's finger 3 detected by the detection unit 41B. As described above, the distance (the operation distance D) from the screen 30 to the user's finger 3 is determined by the change in electrostatic capacitance, for example.

The operation processing unit 41D identifies a mid-air region where the user's finger 3 is present, based on the distance determined by the distance determination unit 41C, and identifies the operation allocated to the identified mid-air region from the region allocation information 44A. The operation processing unit 41D performs an operation according to the identified operation. Specifically, in the example illustrated in FIG. 9, in response to detection of the user's finger 3 at a position P1 in the first region R1, an object corresponding to the user's finger 3 is selected, and the selected object is executed in response to detection of the user's finger 3 at a position P2 in the second region R2.

When the user's finger 3 is held over an object for a certain period of time in the first region R1 immediately above the screen 30, the object may be selected. In response to the user's finger 3 moving from the first region R1 to the second region R2, the selected object is executed. The selected object may be executed after the user's finger 3 stays in the second region R2 for a certain amount of time. In other words, the selected object may be executed immediately when the user's finger 3 is detected in the second region R2, or the selected object may be executed after the user's finger 3 staying in the second region R2 for a certain period of time is detected. In the second region R2, the selection of the selected object for a certain amount of time is set as selection confirmation. In the confirmed selection, the selected object is not changed.

Figure 10:
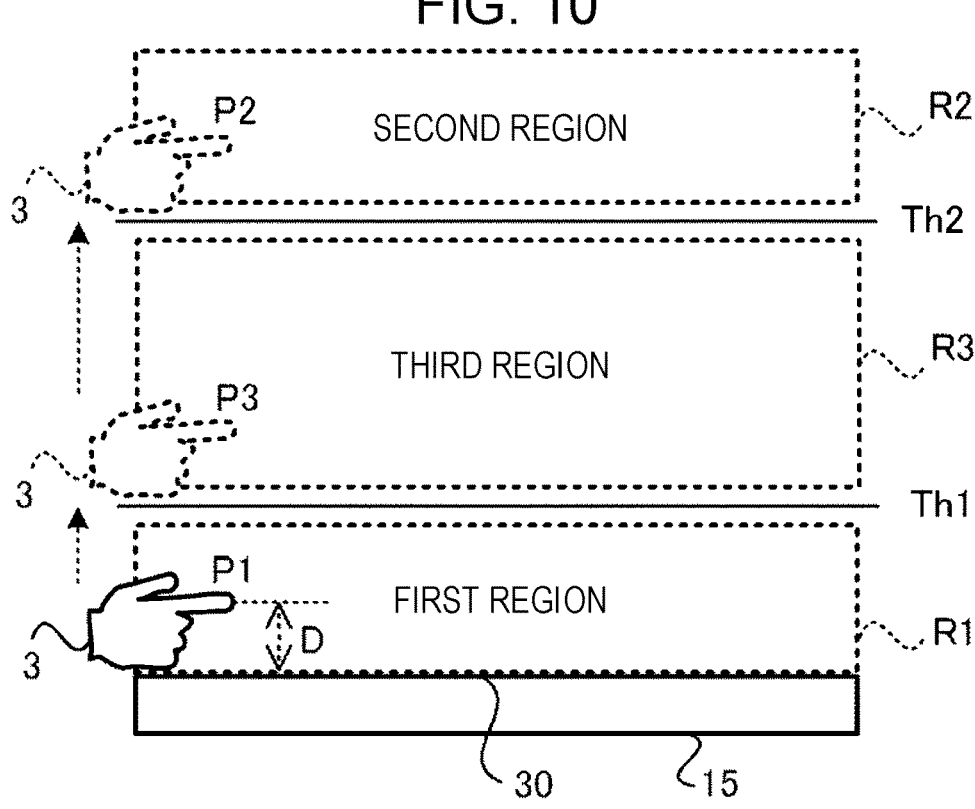
FIG. 10 is a diagram schematically illustrating another example of the mid-air region above an operation panel according to the exemplary embodiment when the operation panel is viewed from a side.

As illustrated in FIG. 10, the allocation unit 41A may further allocate, between the first region R1 and the second region R2, a third region R3 for confirming the selection of the selected object.

FIG. 10 is a diagram schematically illustrating another example of the mid-air region above the operation panel 15 according to this exemplary embodiment when the operation panel is viewed from a side.

In the example illustrated in FIG. 10, the mid-air region is divided into three regions, that is, a first region R1, a second region R2, and a third region R3. The first region R1 is allocated an "operation of selecting an object", the third region R3 is allocated an "operation of confirming selection of a selected object", and the second region R2 is allocated an "operation of executing an object for which selection is confirmed". In other words, the region allocation information 44A includes the number of regions obtained by division and the respective operations allocated to the regions, for example. The "operation of confirming selection of a selected object" is an operation of confirming selection of a selected object on the screen 30, and the "operation of executing an object for which selection is confirmed" is an operation of executing the object for which selection on the screen 30 is confirmed.

The first region R1 and the third region R3 are separated by a first threshold Th1, and the third region R3 and the second region R2 are separated by a second threshold Th2. Each of the first threshold Th1 and the second threshold Th2 is a threshold for the distance from the screen 30 to the user's finger 3 (i.e., the operation distance D), and is set to an appropriate value within a range not exceeding the distance at which the user's finger 3 is detectable. These thresholds are also held as the region allocation information 44A. In other words, the first region R1, the third region R3, and the second region R2 are defined according to their distances from the screen 30, and are allocated in advance different operations (i.e., selection, selection confirmation, and execution) to be performed in response to a contactless operation. The first region R1, the third region R3, and the second region R2 are collectively referred to as "regions R" unless they are distinguished.

In the example illustrated in FIG. 10, in response to detection of the user's finger 3 at a position P1 in the first region R1, an object corresponding to the user's finger 3 is selected, the selection of the selected object is confirmed in response to detection of the user's finger 3 at a position P3 in the third region R3, and the object for which the selection is confirmed is executed in response to detection of the user's finger 3 at a position P2 in the second region R2. In other words, selection, selection confirmation, and execution of an object are performed in response to movement of the user's finger 3 to the positions P1, P3, and P2 in this order.

The range of the third region R3 in the direction (Z-axis direction) orthogonal to the screen 30 is desirably longer than the range of the first region R1 in the direction (Z-axis direction) orthogonal to the screen 30. In the third region R3, the selection of the object is confirmed, whereas the execution of the object is suspended. Even if the user's finger 3 moves in the third region R3, the object for which the selection is confirmed is not changed. The range of the third region R3 is set to be longer than the range of the first region R1, thereby maintaining a certain distance until the object for which the selection is confirmed is executed. The object is not executed as long as the user's finger 3 stays in the third region R3, which allows the user to determine to stop execution of the object or to select the object again.

The start position of the operation (that is, the selection position) is difficult to identify in midair. In the examples illustrated in FIGS. 9 and 10, the start position of the operation is closest to the screen 30, which is easy to identify. Furthermore, the selection of an object can be performed at a position closest to the screen 30, and thus erroneous selection of an object may be less likely to occur.

Figure 11:
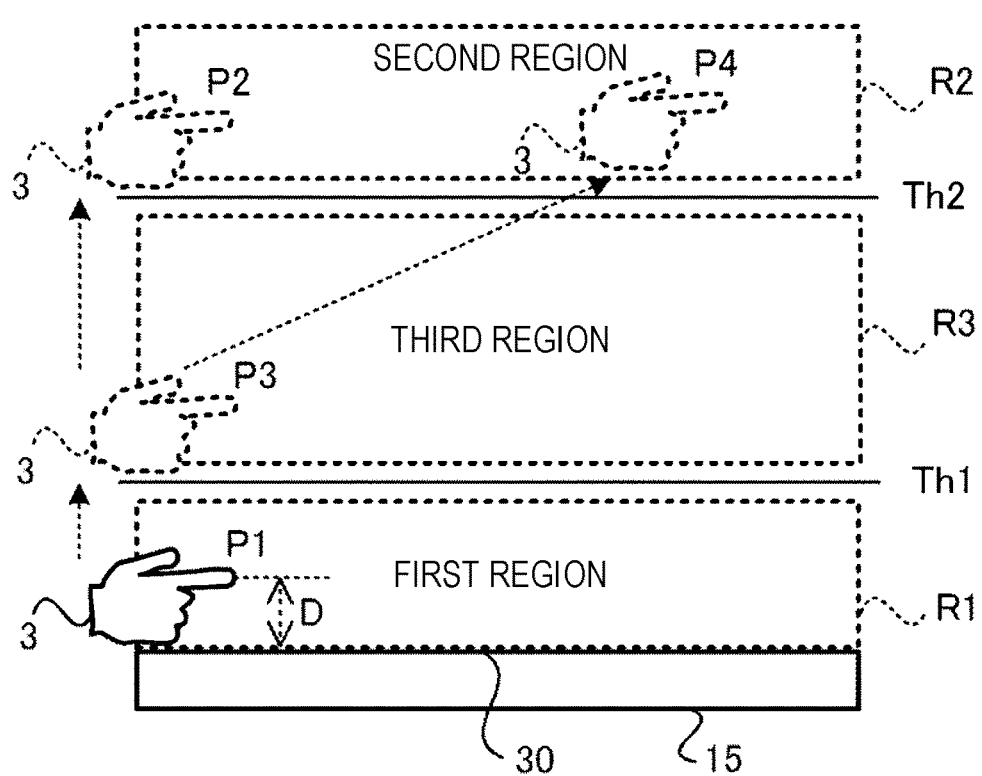
FIG. 11 is a diagram illustrating a method for executing an object with a user's finger.

FIG. 11 is a diagram illustrating a method for executing an object with the user's finger 3.

As illustrated in FIG. 11, in this exemplary embodiment, the user's finger 3 is not necessarily moved to the positions P1, P3, and P2 in this order for selection, selection confirmation, and execution of an object. For example, the user's finger 3 may be moved to positions P1, P2, and P4 in this order.

Figures 12, 13:
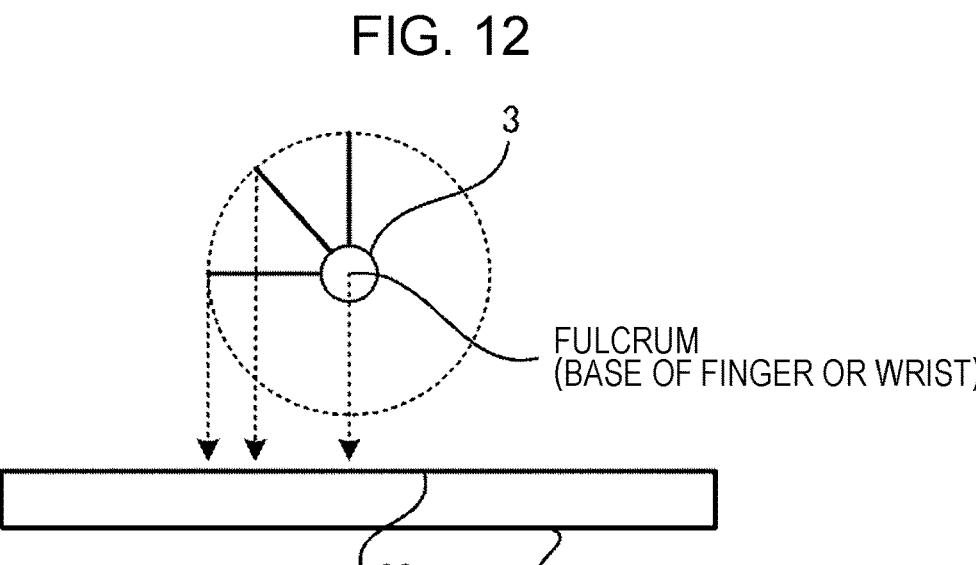
FIG. 12 is a diagram schematically illustrating a trajectory along which the user's finger moves.
FIG. 13 is a diagram illustrating a method for canceling the execution of an object with the user's finger.

FIG. 12 is a diagram schematically illustrating a trajectory along which the user's finger 3 moves.

As illustrated in FIG. 12, in a case where the user's finger 3 is set as the target with respect to the screen 30, the finger moves upward with an arc trajectory with the base of the finger as a fulcrum. Accordingly, as the finger moves upward, the finger deviates from the object to be selected in the screen 30. The same applies to the case where the wrist is used as the fulcrum.

In this exemplary embodiment, by contrast, as illustrated in FIG. 11, when moving from the first region R1 to the third region R3, the user's finger 3 does not have to move vertically to the object. Thus, erroneous operation may be less likely to occur.

FIG. 13 is a diagram illustrating a method for canceling the execution of an object with the user's finger 3.

As illustrated in FIG. 13, in response to the user's finger 3 returning to a position P5 in the first region R1 after moving from the position P1 in the first region R1 to the position P3 in the third region R3, or in response to the user's finger 3 moving to a position P6 out of the first region R1, the second region R2, and the third region R3 after moving from the position P1 in the first region R1 to the position P3 in the third region R3, the operation processing unit 41D cancels the selection of the selected object. In response to movement to the position P5, the selection of the selected object is temporarily canceled, and the re-selection of an object is enabled. In response to movement to the position P6, the selection of the selected object is canceled.

Referring back to FIG. 8, the display control unit 41E also controls the display of the screen 30 according to the operation performed by the operation processing unit 41D. Hereinafter, a display form for visually displaying the region (e.g., any one of the first region R1, the second region R2, and the third region R3) in which the user's finger 3 is present and the current operation state (e.g., any one of selection, selection confirmation, and execution) will be described with reference to FIGS. 14 to 18B.

Figure 14:
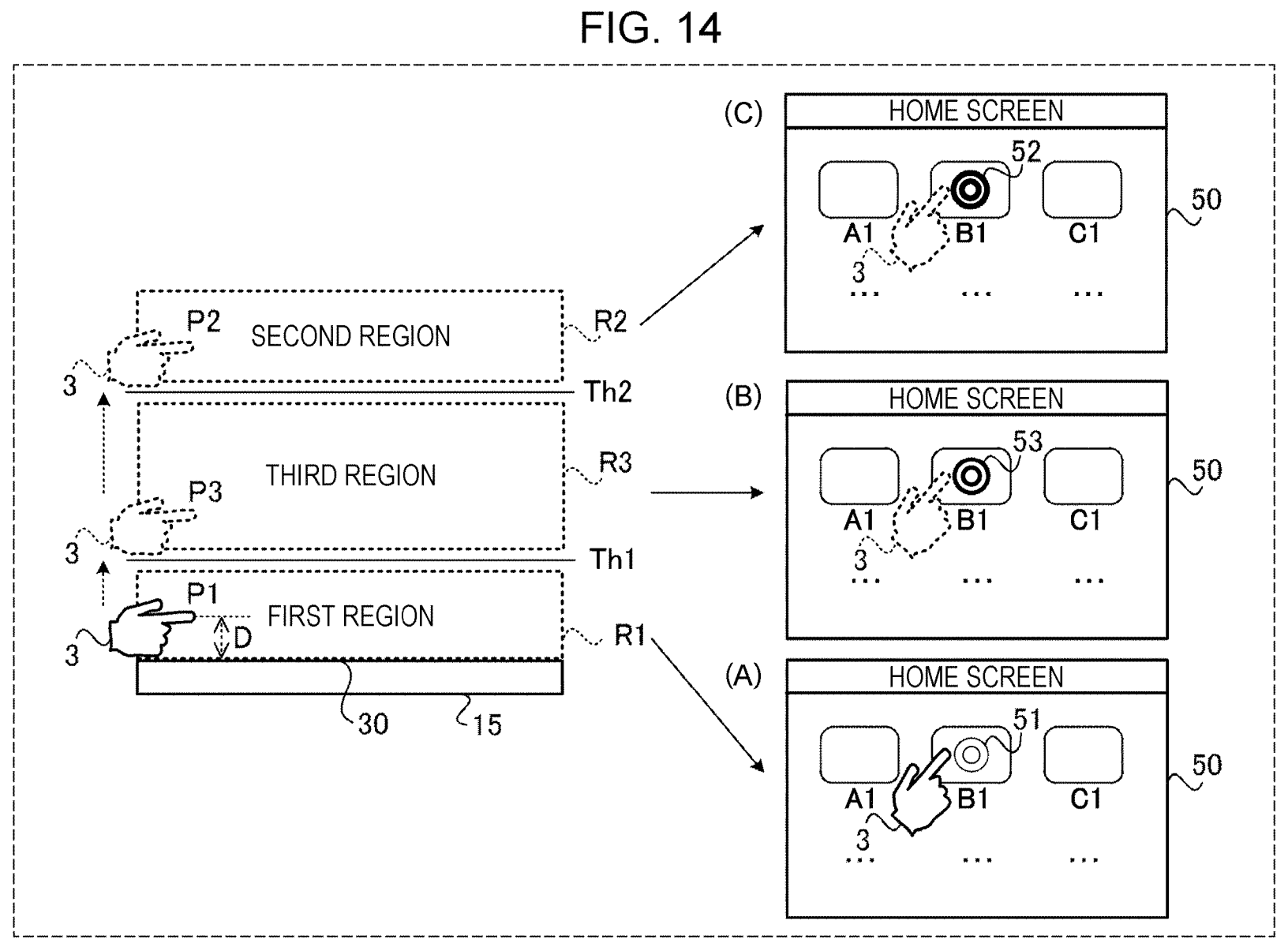

FIG. 14 is a diagram illustrating an example of a home screen 50 corresponding to the position of the user's finger 3 according to this exemplary embodiment. The home screen 50 is an example of the screen 30. In the example illustrated in FIG. 14, the first region R1, the second region R2, and the third region R3 are allocated (FIG. 10). The same applies when the first region R1 and the second region R2 are allocated (FIG. 9).

In FIG. 14, as illustrated in part (A), when the user's finger 3 is in the position P1 in the first region R1, the display control unit 41E performs control such that a first marker 51 is displayed on the home screen 50 in association with an object B1. As illustrated in part (B), when the user's finger 3 is in the position P3 in the third region R3, the display control unit 41E performs control such that a third marker 53 is displayed on the home screen 50 in association with the object B1. As illustrated in part (C), when the user's finger 3 is in the position P2 in the second region R2, the display control unit 41E performs control such that a second marker 52 is displayed on the home screen 50 in association with the object B1.

The first marker 51, the second marker 52, and the third marker 53 have different display forms. In the example illustrated in FIG. 14, the difference in display form is represented by a difference in line thickness. Any other way may be used. For example, the difference in display form may be represented by a difference in the shape, color, line type, size, or the like of the marker, and any display form capable of identifying each marker may be used. Alternatively, the third marker 53 may be blinked slightly before the user's finger 3 reaches the second region R2 to notify the user that the object is to be executed soon.

In the example illustrated in FIG. 14, the first marker 51, the second marker 52, and the third marker 53 allow the user to grasp in which region (e.g., any one of the first region R1, the second region R2, and the third region R3) their finger is present, and the current operation state (e.g., any one of selection, selection confirmation, and execution).

Depending on the type of the object (e.g., a key on a keyboard), the character representing the object being selected may be hidden by the marker and invisible. Accordingly, the display control unit 41E may change the size or shape of each of the first marker 51, the second marker 52, and the third marker 53 in accordance with the type of the object.

Figure 15A:
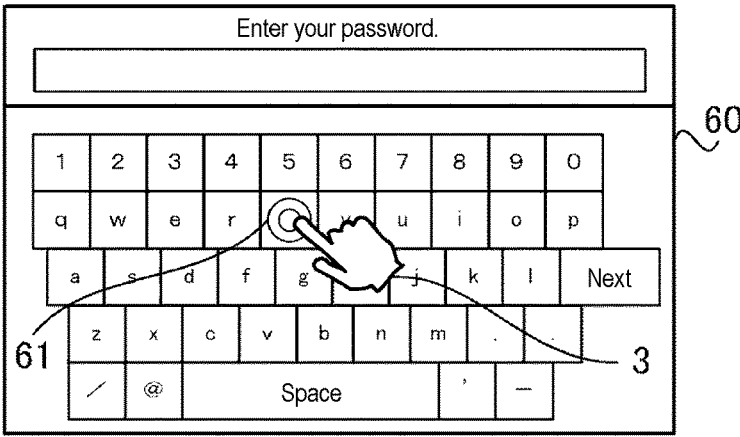
FIGS. 15A to 15C are diagrams illustrating an example of a keyboard screen corresponding to the position of the user's finger according to the exemplary embodiment.
Figure 15B:
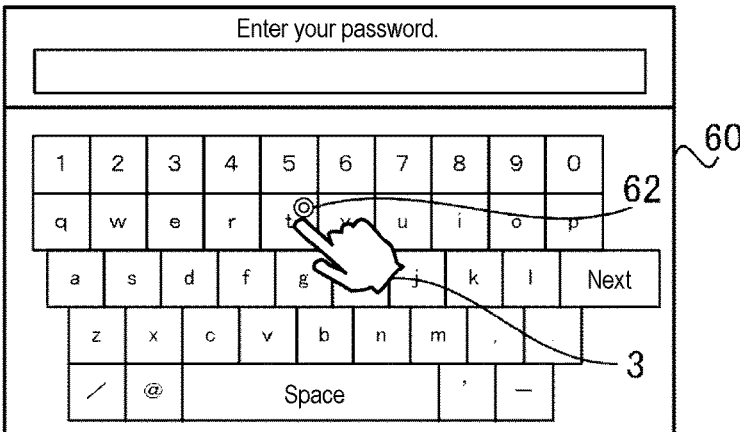
Figure 15C:
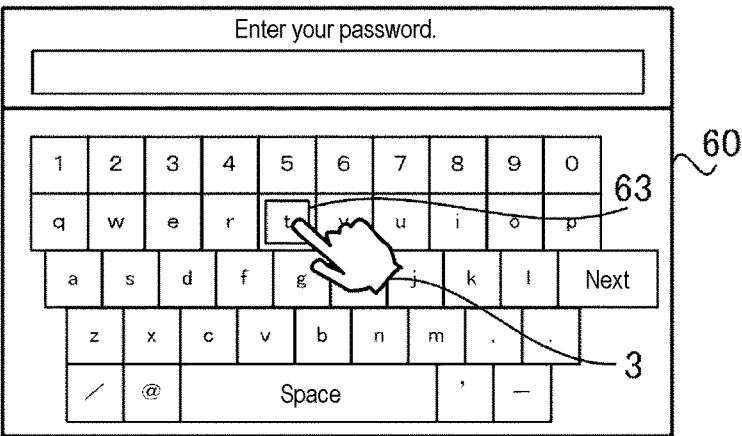

FIGS. 15A to 15C are diagrams illustrating an example of a keyboard screen 60 corresponding to the position of the user's finger 3 according to this exemplary embodiment. The keyboard screen 60 is an example of the screen 30.

As illustrated in FIG. 15A, the character "t" on the keyboard screen 60 is to be selected. When a marker 61 corresponding to the position of the user's finger 3 is displayed on the character "t", the character "t" is hidden by the marker 61 and invisible. Accordingly, for example, as illustrated in FIG. 15B, a marker 62, which is a size-reduced version of the marker 61, is displayed to make the character "t" visible. Alternatively, as illustrated in FIG. 15C, a marker 63 having a shape different from the marker 61 may be displayed to make the character "t" visible. The marker 63 is, for example, a rectangular frame surrounding the character "t". The marker 62 and the marker 63 are examples, and any form of marker may be used as long as the character "t" is visible.

In some cases, an object to be selected is hidden by the user's finger 3 and invisible. In such cases, the display control unit 41E performs control such that a first sub-window including the object and the first marker 51 is displayed in a different screen area from the object. Further, the display control unit 41E performs control such that a third sub-window including the object and the third marker 53 is displayed in the screen area. Further, the display control unit 41E performs control such that a second sub-window including the object and the second marker 52 is displayed in the screen area.

Figure 16A:
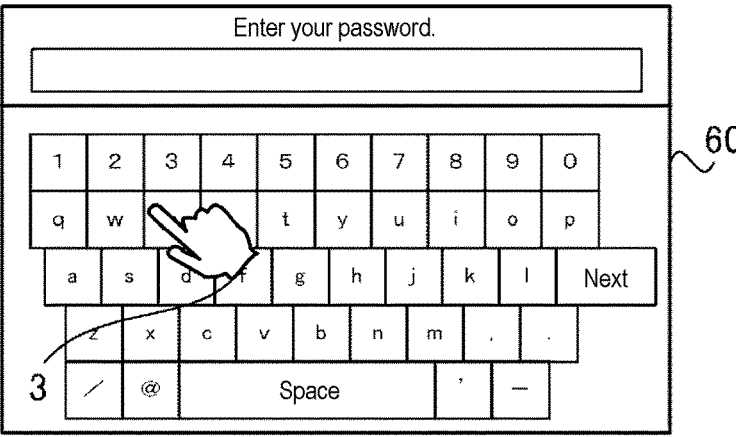
FIGS. 16A to 16C are diagrams illustrating another example of the keyboard screen corresponding to the position of the user's finger according to the exemplary embodiment.
Figure 16B:
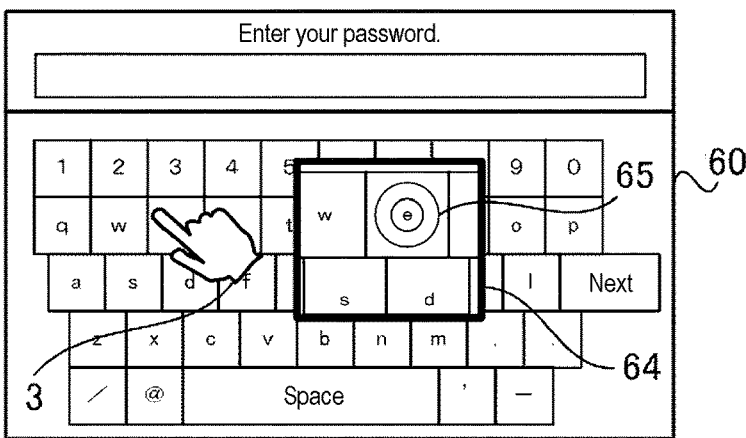
Figure 16C:
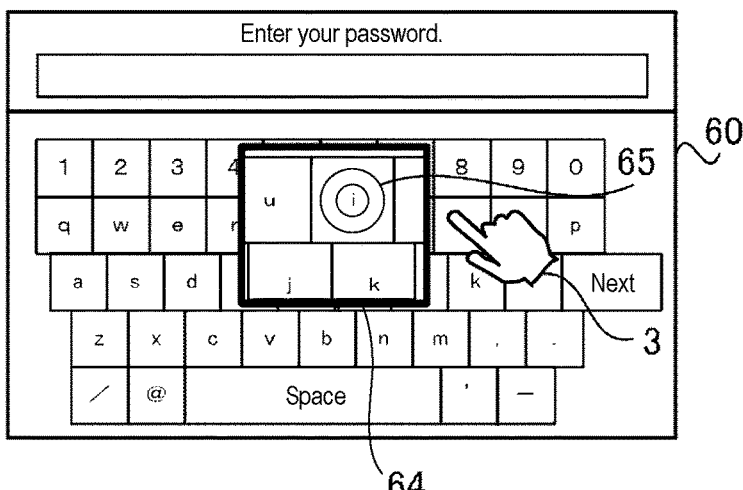

FIGS. 16A to 16C are diagrams illustrating another example of the keyboard screen 60 corresponding to the position of the user's finger 3 according to this exemplary embodiment.

As illustrated in FIG. 16A, in a case where the character "e" on the keyboard screen 60 is to be selected, the character "e" corresponding to the position of the user's finger 3 may be hidden by the user's finger 3 and invisible. Accordingly, for example, as illustrated in FIG. 16B, a sub-window 64 including the character "e" and a marker 65 is displayed in a different screen area from the character "e". Likewise, in a case where the character "i" on the keyboard screen 60 is to be selected, the character "i" corresponding to the position of the user's finger 3 is hidden by the user's finger 3 and invisible. Thus, for example, as illustrated in FIG. 16C, the sub-window 64 including the character "i" and the marker 65 is displayed in a different screen area from the character "i". In the sub-window 64, the object (e.g., the character "e" or the character "i") selected by the user's finger 3 is displayed in an enlarged view, which allows the user to easily visually recognize the object being selected.

Figure 17A:
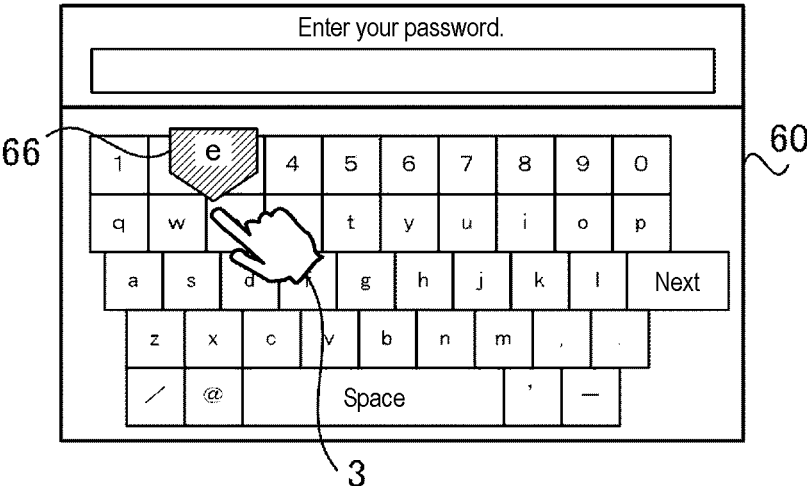
FIGS. 17A and 17B are diagrams illustrating still another example of the keyboard screen corresponding to the position of the user's finger according to the exemplary embodiment.
Figure 17B:
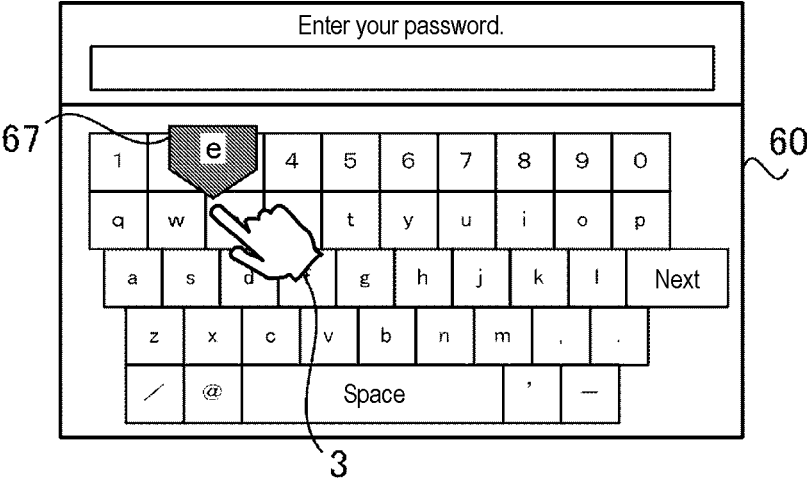

FIGS. 17A and 17B are diagrams illustrating still another example of the keyboard screen 60 corresponding to the position of the user's finger 3 according to this exemplary embodiment.

As illustrated in FIG. 17A, in a case where the character "e" on the keyboard screen 60 is to be selected, a marker 66 may be displayed on the keyboard screen 60 in association with the character "e" when the user's finger 3 is at the position P1 in the first region R1. The marker 66 is displayed such that, for example, the background color of the character "e" is "blue" so that the character "e" to be selected can be visually recognized. In response to movement of the user's finger 3 to the position P2 in the second region R2, a marker 67 is displayed on the keyboard screen 60 in association with the character "e". The marker 67 is displayed such that, for example, the background color of the character "e" is "red" so that the character "e" to be executed can be visually recognized. In this way, changing the background color of the marker according to the position of the user's finger 3 allows the user to grasp in which region the user's finger 3 is present.

While the display of the keyboard screen 60 is illustrated in the example illustrated in FIGS. 17A and 17B, the display of the home screen 50 illustrated in FIG. 14 can be performed in a similar way.

Figure 18A:
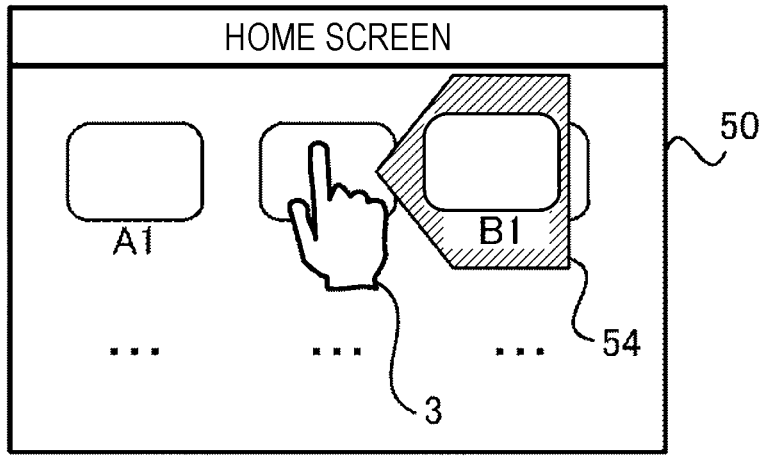
FIGS. 18A and 18B are diagrams illustrating still another example of the home screen corresponding to the position of the user's finger according to the exemplary embodiment.
Figure 18B:
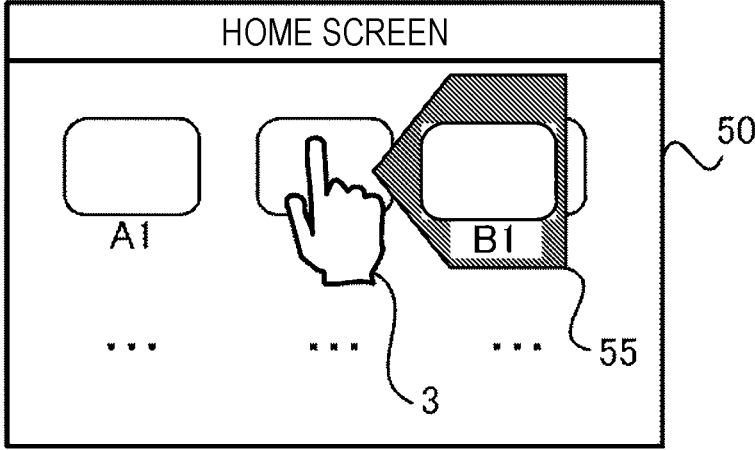

FIGS. 18A and 18B are diagrams illustrating still another example of the home screen 50 corresponding to the position of the user's finger 3 according to this exemplary embodiment.

As illustrated in FIG. 18A, in a case where an object B1 on the home screen 50 is to be selected, a marker 54 may be displayed on the home screen 50 in association with the object B1 when the user's finger 3 is at the position P1 in the first region R1. The marker 54 is displayed such that, for example, the background color of the object B1 is "blue" so that the object B1 to be selected can be visually recognized. In response to movement of the user's finger 3 to the position P2 in the second region R2, a marker 55 is displayed on the home screen 50 in association with the object B1. The marker 55 is displayed such that, for example, the background color of the object B1 is "red" so that the object B1 to be executed can be visually recognized. In this way, as in the example illustrated in FIGS. 17A and 17B, changing the background color of the marker according to the position of the user's finger 3 allows the user to grasp in which region the user's finger 3 is present.

Next, the operation of the image processing apparatus 10 according to this exemplary embodiment will be described with reference to FIGS. 19 and 20.

Figure 19:
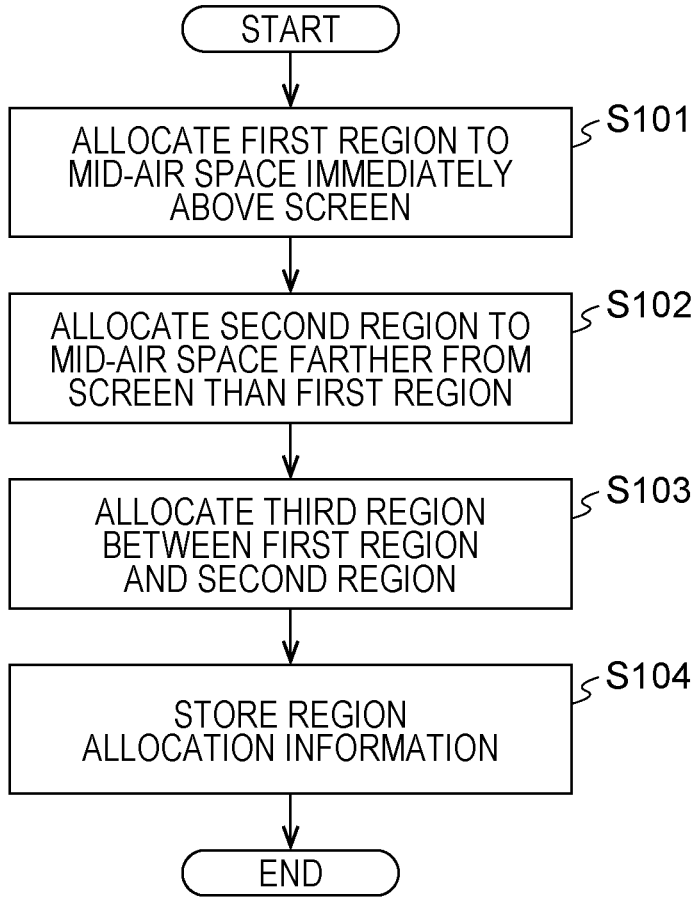
FIG. 19 is a flowchart illustrating an example of a region allocation process based on an information processing program according to the exemplary embodiment.

FIG. 19 is a flowchart illustrating an example of a region allocation process based on an information processing program according to this exemplary embodiment. In the example illustrated in FIG. 19, three regions are allocated will be described. The same applies to the allocation of two regions.

First, in response to an instruction to execute a region allocation process through the operation panel 15, the CPU 41 activates the information processing program and executes the steps described below.

In step S101 in FIG. 19, as an example, as illustrated in FIG. 10 described above, the CPU 41 allocates the first region R1 for selecting an object to a mid-air space immediately above the screen 30 of the operation panel 15.

In step S102, the CPU 41 allocates the second region R2 for executing the selected object to a mid-air space farther from the screen 30 than the first region R1 allocated in step S101.

In step S103, the CPU 41 allocates, between the first region R1 and the second region R2, the third region R3 for confirming the selection of the selected object.

In step S104, the CPU 41 stores information on the allocations performed in steps S101 to S103 as the region allocation information 44A in the non-volatile memory 44. Then, the region allocation process according to the information process program ends.

Figure 20:
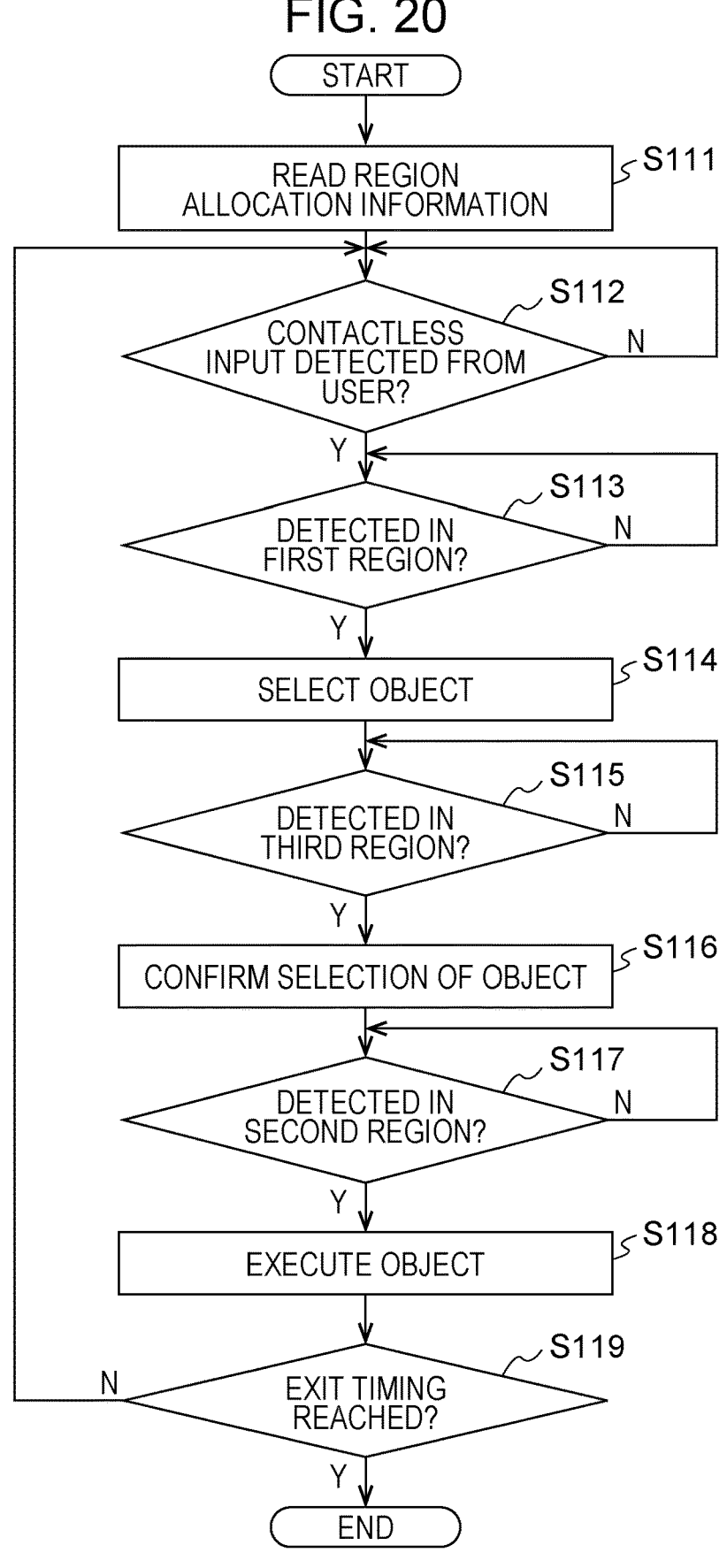
FIG. 20 is a flowchart illustrating an example of an object selection and execution process based on an information processing program according to the exemplary embodiment.

FIG. 20 is a flowchart illustrating an example of an object selection and execution process based on an information processing program according to this exemplary embodiment. In the example illustrated in FIG. 20, an object is selected and executed using the three regions allocated by the region allocation process illustrated in FIG. 19.

First, in response to an instruction to execute an object selection and execution process through the operation panel 15, the CPU 41 activates the information processing program and executes the steps described below.

In step S111 in FIG. 20, the CPU 41 reads the region allocation information 44A from the non-volatile memory 44.

In step S112, the CPU 41 determines whether a contactless input from the user is detected. If it is determined that a contactless input from the user is detected (if a positive determination is made), the process proceeds to step S113. If it is determined that no contactless input from the user is detected (if a negative determination is made), the process stands by in step S112.

In step S113, the CPU 41 determines whether a contactless input from the user is detected in the first region R1. If it is determined that a contactless input from the user is detected in the first region R1 (if a positive determination is made), the process proceeds to step S114. If it is determined that no contactless input from the user is detected in the first region R1 (if a negative determination is made), the process stands by in step S113.

In step S114, the CPU 41 selects an object corresponding to the contactless input from the user for the first region R1.

In step S115, the CPU 41 determines whether a contactless input from the user is detected in the third region R3. If it is determined that a contactless input from the user is detected in the third region R3 (if a positive determination is made), the process proceeds to step S116. If it is determined that no contactless input from the user is detected in the third region R3 (if a negative determination is made), the process stands by in step S115.

In step S116, the CPU 41 confirms the selection of the object selected in step S114 for the third region R3.

In step S117, the CPU 41 determines whether a contactless input from the user is detected in the second region R2. If it is determined that a contactless input from the user is detected in the second region R2 (if a positive determination is made), the process proceeds to step S118. If it is determined that no contactless input from the user is detected in the second region R2 (if a negative determination is made), the process stands by in step S117.

In step S118, the CPU 41 executes the object for which the selection is confirmed in step S116 for the second region R2.

In step S119, the CPU 41 determines whether the exit timing is reached. If it is determined that the exit timing is not reached (if a negative determination is made), the process returns to step S112, and the processing is repeated. If it is determined that the exit timing is reached (if a positive determination is made), the object selection and execution process based on the information processing program ends. As used herein, the term "exit timing" refers to a timing at which the power is turned off or a timing at which the image processing apparatus 10 enters a sleep mode, for example.

As described above, according to this exemplary embodiment, a first region for selecting an object is allocated to a mid-air space immediately above a screen, and a second region for executing the selected object is allocated to a mid-air space away from the screen. Thus, erroneous selection of an object may be less likely to occur, and a selected object may be reliably executed.

In the exemplary embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiments above, and may be changed.

An image processing apparatus has been described as an example of an information processing apparatus according to some exemplary embodiments. Exemplary embodiments may be provided as a program for causing a computer to execute the functions of the information processing apparatus. Exemplary embodiments may be provided as a non-transitory computer-readable storage medium storing such a program.

In addition, the configuration of an information processing apparatus described in the exemplary embodiment described above is an example and may be changed depending on the situation without departing from the scope of the present disclosure.

Additionally, a process flow of a program described in the exemplary embodiment described above is also an example, and any unnecessary step may be deleted, a new step may be added, or the processing order may be changed without departing from the scope of the present disclosure.

In the exemplary embodiment described above, a program is executed to implement processing according to an exemplary embodiment by a software configuration using a computer, by way of example but not limitation. The exemplary embodiment may be implemented by, for example, a hardware configuration or a combination of a hardware configuration and a software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

In respect of the exemplary embodiment described above, the following is further disclosed.

(Appendix)

An information processing apparatus according to (((1))) includes a processor, and the processor is configured to, in an operation of selecting and executing an object in a screen by a contactless operation with a target, allocate a first region for selecting the object to a mid-air space immediately above the screen, and allocate a second region for executing the selected object to a mid-air space farther from the screen than the first region.

An information processing apparatus according to (((2))) is the information processing apparatus according to (((1))), in which the processor is configured to select an object corresponding to a position of the target, in the screen, in response to detection of the target in the first region, and execute the selected object in response to detection of the target in the second region.

An information processing apparatus according to (((3))) is the information processing apparatus according to (((1))) or (((2))), in which the processor is configured to further allocate, between the first region and the second region, a third region for confirming selection of the selected object.

An information processing apparatus according to (((4))) is the information processing apparatus according to (((3))), in which the processor is configured to select an object corresponding to a position of the target, in the screen, in response to detection of the target in the first region, confirm selection of the selected object in response to detection of the target in the third region, and execute the object for which the selection is confirmed in response to detection of the target in the second region.

An information processing apparatus according to (((5))) is the information processing apparatus according to (((3))) or (((4))), in which a range of the third region in a direction orthogonal to the screen is longer than a range of the first region in the direction orthogonal to the screen.

The information processing apparatus according to (((6))) is the information processing apparatus according to any one of (((3))) to (((5))), in which the processor is configured to cancel the selection of the selected object in response to the target returning to the first region after moving from the first region to the third region or in response to the target moving out of the first region, the second region, and the third region after moving from the first region to the third region.

An information processing apparatus according to (((7))) is the information processing apparatus according to (((1))) or (((2))), in which the processor is configured to perform control such that a first marker is displayed in association with the object when the target is in the first region and such that a second marker having a different display form from the first marker is displayed in association with the object when the target is in the second region.

An information processing apparatus according to (((8))) is the information processing apparatus according to (((7))), in which the processor is configured to change a size or a shape of each of the first marker and the second marker in accordance with a type of the object.

An information processing apparatus according to (((9))) is the information processing apparatus according to (((7))), in which the processor is configured to perform control such that a first sub-window including the object and the first marker is displayed in a different screen area from the object and a second sub-window including the object and the second marker is displayed in the screen area.

An information processing program according to (((10))) causes a computer to execute, in an operation of selecting and executing an object in a screen by a contactless operation with a target, allocating a first region for selecting the object to a mid-air space immediately above the screen, and allocating a second region for executing the selected object to a mid-air space farther from the screen than the first region.

What is claimed is:

1. An information processing apparatus comprising:
a processor configured to:
in an operation of selecting and executing an object in a screen by a contactless operation with a target,
allocate a first region for selecting the object to a mid-air space immediately above the screen;
allocate a second region for executing the selected object to a mid-air space farther from the screen than the first region;
allocate, between the first region and the second region, a third region for confirming selection of the selected object; and
cancel the selection of the selected object anytime (i) the target returns to the first region after moving from the first region to the third region, or (ii) the target moves out of the first region, the second region, and the third region after moving from the first region to the third region.

2. The information processing apparatus according to claim 1,
wherein the processor is configured to select an object corresponding to a position of the target, in the screen, in response to detection of the target in the first region, and execute the selected object in response to detection of the target in the second region.

3. The information processing apparatus according to claim 1, wherein the processor is configured to select an object corresponding to a position of the target, in the screen, in response to detection of the target in the first region, confirm selection of the selected object in response to detection of the target in the third region, and execute the object for which the selection is confirmed in response to detection of the target in the second region.

4. The information processing apparatus according to claim 1, wherein a range of the third region in a direction orthogonal to the screen is longer than a range of the first region in the direction orthogonal to the screen.

5. The information processing apparatus according to claim 1, wherein the processor is configured to perform control such that:
a first marker indicating selection of an operation is displayed in association with the object when the target is in the first region; and a second marker indicating selection of the operation having a different display form from the first marker is displayed in association with the object when the target is in the second region.

6. The information processing apparatus according to claim 5, wherein the processor is configured to change a size or a shape of each of the first marker and the second marker in accordance with a type of the object.

7. The information processing apparatus according to claim 5, wherein the processor is configured to perform control such that:

a first sub-window including the object and the first marker is displayed in æ an area of the screen different from the object; and a second sub-window including the object and the second marker is displayed within an area of the screen.

8. A non-transitory computer readable medium storing a program causing a computer to execute a process for information processing, the process comprising:

in an operation of selecting and executing an object in a screen by a contactless operation with a target, allocating a first region for selecting the object to a mid-air space immediately above the screen;

allocating a second region for executing the selected object to a mid-air space farther from the screen than the first region;

allocating, between the first region and the second region, a third region for confirming selection of the selected object; and cancelling the selection of the selected object anytime (i) the target returns to the first region after moving from first region to the third region, or (ii) the target moves out of the first region, the second region, and the third region after moving from the first region to the third region.

9. An information processing method comprising:

in an operation of selecting and executing an object in a screen by a contactless operation with a target, allocating a first region for selecting the object to a mid-air space immediately above the screen;

allocating a second region for executing the selected object to a mid-air space farther from the screen than the first region;

allocating between the first region and the second region, a third region for confirming selection of the selected object, and cancelling the selection of the selected object anytime (i) the target returns to the first region after moving from the first region to the third region, or (ii) the target moves out of the first region, the second region, and the third region after moving from the first region to the third region.

* * * * *